(12) United States Patent
Noyes et al.

(10) Patent No.: US 7,704,937 B2
(45) Date of Patent: Apr. 27, 2010

(54) COMPOSITION COMPRISING AN ORGANOSILICONE/DIOL LIPOPHILIC FLUID FOR TREATING OR CLEANING FABRICS

(75) Inventors: Anna Vadimovna Noyes, Hamilton, OH (US); John Cort Severns, West Chester, OH (US); Frederick Anthony Hartman, Cincinnati, OH (US); James Charles Theophile Roger Burckett-St. Laurent, Lasne (BE); Arseni V. Radomyselski, Hamilton, OH (US); Paul Amaat France, West Chester, OH (US); Jeffrey John Scheibel, Loveland, OH (US); Christiaan Arthur Jacques Kamiel Thoen, West Chester, OH (US); John Christopher Deak, West Chester, OH (US); Phillip Kyle Vinson, Fairfield, OH (US); Nabil Yaqub Sakkab, Cincinnati, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 12/206,306

(22) Filed: Sep. 8, 2008

(65) Prior Publication Data
US 2009/0005285 A1 Jan. 1, 2009

Related U.S. Application Data

(62) Division of application No. 11/183,546, filed on Jul. 18, 2005, now Pat. No. 7,439,216, which is a division of application No. 09/849,843, filed on May 4, 2001, now Pat. No. 6,939,837.

(60) Provisional application No. 60/209,250, filed on Jun. 5, 2000.

(51) Int. Cl.
C11D 3/44 (2006.01)
C11D 9/36 (2006.01)
C11D 1/835 (2006.01)

(52) U.S. Cl. .................. 510/289; 510/276; 510/285; 510/304; 510/338; 510/340; 510/341; 510/343; 510/356; 510/371; 510/407; 510/413; 510/427; 510/466

(58) Field of Classification Search .......... 510/276, 510/285, 289, 304, 338, 340, 341, 343, 356, 510/371, 407, 413, 427, 466
See application file for complete search history.

(56) References Cited

U.S. PATENT DOCUMENTS

| | | | |
|---|---|---|---|
| 3,635,667 A | 1/1972 | Keay et al. | |
| 3,663,160 A | 5/1972 | Stone et al. | |
| 3,854,871 A | 12/1974 | Eanzel et al. | |
| 4,077,770 A | 3/1978 | Rouvellat et al. | |
| 4,097,397 A | 6/1978 | Mizutani et al. | |
| 4,102,824 A | 7/1978 | Mizutani et al. | |
| 4,111,034 A | 9/1978 | Hubner | |
| 4,137,044 A | 1/1979 | Flower | |
| 4,207,072 A | 6/1980 | Schuierer et al. | |
| 4,267,077 A | 5/1981 | Niimi et al. | |
| 4,311,695 A * | 1/1982 | Starch ..................... | 514/63 |
| 4,336,024 A | 6/1982 | Denissenko et al. | |
| 4,501,682 A | 2/1985 | Goodman et al. | |
| 4,639,321 A | 1/1987 | Barrat et al. | |
| 4,685,930 A | 8/1987 | Kasprzak | |
| 4,708,807 A * | 11/1987 | Kemerer ................ | 510/287 |
| 4,761,896 A | 8/1988 | Miyata | |
| 4,909,962 A | 3/1990 | Clark | |
| 5,036,108 A * | 7/1991 | Asahi et al. ............. | 514/772 |
| 5,037,485 A | 8/1991 | Chromecek et al. | |
| 5,046,337 A | 9/1991 | Ro et al. | |
| 5,057,240 A | 10/1991 | Madore et al. | |
| 5,116,426 A | 5/1992 | Asano et al. | |
| 5,271,775 A | 12/1993 | Asano et al. | |
| 5,302,313 A | 4/1994 | Asano et al. | |
| 5,360,571 A | 11/1994 | Kilgour et al. | |
| 5,443,747 A | 8/1995 | Inada et al. | |
| 5,503,681 A | 4/1996 | Inada et al. | |
| 5,503,778 A | 4/1996 | Liu et al. | |
| 5,520,827 A | 5/1996 | Danner | |
| 5,547,476 A | 8/1996 | Siklosi et al. | |
| 5,593,507 A | 1/1997 | Inada et al. | |
| 5,597,792 A | 1/1997 | Klier et al. | |
| 5,628,833 A | 5/1997 | McCormack et al. | |
| 5,676,705 A | 10/1997 | Jureller et al. | |
| 5,683,473 A | 11/1997 | Jureller et al. | |
| 5,683,977 A * | 11/1997 | Jureller et al. ........... | 510/286 |
| 5,690,750 A | 11/1997 | Inada et al. | |
| 5,705,562 A | 1/1998 | Hill | |
| 5,707,613 A | 1/1998 | Hill | |
| 5,716,456 A | 2/1998 | Inada et al. | |
| 5,722,781 A | 3/1998 | Yamaguchi | |
| 5,741,365 A | 4/1998 | Inada et al. | |
| 5,746,776 A | 5/1998 | Smith et al. | |
| 5,769,962 A | 6/1998 | Inada et al. | |

(Continued)

FOREIGN PATENT DOCUMENTS

CA 1 239 326 7/1988

(Continued)

OTHER PUBLICATIONS

Trilo et al.; "Critical Micelle Density for the Self-Assembly of Block Copolymer Surfactants in Supercritical Carbon Dioxide"; pp. 416-421.

(Continued)

Primary Examiner—Charles I Boyer
(74) Attorney, Agent, or Firm—Armina E. Matthews; Kim William Zerhy; Steven W. Miller

(57) ABSTRACT

A composition for treating or cleaning fabric articles, especially articles of clothing, linen and drapery, wherein the composition comprises a lipophilic fluid, a polyalkyleneoxide polysiloxane surfactant, and a second surfactant.

12 Claims, No Drawings

U.S. PATENT DOCUMENTS

| | | | |
|---|---|---|---|
| 5,783,092 A | 7/1998 | Brown et al. | |
| 5,789,368 A | 8/1998 | You et al. | |
| 5,804,548 A | 9/1998 | Davis | |
| 5,811,383 A | 9/1998 | Klier et al. | |
| 5,840,675 A | 11/1998 | Yeazell | |
| 5,858,022 A | 1/1999 | Romack et al. | |
| 5,865,852 A | 2/1999 | Berndt | |
| 5,866,005 A | 2/1999 | DeSimone et al. | |
| 5,876,510 A | 3/1999 | Kuemin et al. | |
| 5,877,133 A | 3/1999 | Good | |
| 5,888,250 A | 3/1999 | Hayday et al. | |
| 5,912,408 A | 6/1999 | Trinh et al. | |
| 5,929,012 A | 7/1999 | Del Duca et al. | |
| 5,942,007 A | 8/1999 | Berndt et al. | |
| 5,944,996 A | 8/1999 | DeSimone et al. | |
| 5,954,869 A | 9/1999 | Elfersy et al. | |
| 5,972,041 A | 10/1999 | Smith et al. | |
| 5,977,040 A | 11/1999 | Inada et al. | |
| 5,977,045 A | 11/1999 | Murphy | |
| 5,985,177 A * | 11/1999 | Yoshida et al. | 516/113 |
| 5,985,810 A | 11/1999 | Inada et al. | |
| 6,002,038 A | 12/1999 | Philippe et al. | |
| 6,013,683 A | 1/2000 | Hill et al. | |
| 6,042,617 A | 3/2000 | Berndt | |
| 6,042,618 A | 3/2000 | Berndt et al. | |
| 6,056,789 A | 5/2000 | Berndt et al. | |
| 6,059,845 A | 5/2000 | Berndt et al. | |
| 6,060,546 A | 5/2000 | Powell et al. | |
| 6,063,135 A | 5/2000 | Berndt et al. | |
| 6,077,520 A * | 6/2000 | Tominaga | 424/401 |
| 6,086,635 A | 7/2000 | Berndt et al. | |
| 6,114,295 A | 9/2000 | Murphy | |
| 6,120,778 A * | 9/2000 | Simonnet | 424/401 |
| 6,131,421 A | 10/2000 | Jureller et al. | |
| 6,136,766 A | 10/2000 | Inada et al. | |
| 6,148,644 A * | 11/2000 | Jureller et al. | 68/13 R |
| 6,156,074 A | 12/2000 | Hayday et al. | |
| 6,177,399 B1 | 1/2001 | Mei et al. | |
| 6,179,880 B1 | 1/2001 | Smith | |
| 6,197,282 B1 * | 3/2001 | Oshima et al. | 424/59 |
| 6,200,352 B1 | 3/2001 | Romack et al. | |
| 6,200,393 B1 | 3/2001 | Romack et al. | |
| 6,200,943 B1 | 3/2001 | Romack et al. | |
| 6,204,233 B1 | 3/2001 | Smith et al. | |
| 6,228,826 B1 | 5/2001 | DeYoung et al. | |
| 6,242,408 B1 | 6/2001 | Elms et al. | |
| 6,258,130 B1 | 7/2001 | Murphy | |
| 6,273,919 B1 | 8/2001 | Hayday | |
| 6,306,409 B1 * | 10/2001 | Ogawa et al. | 424/401 |
| 6,310,029 B1 | 10/2001 | Kilgour et al. | |
| 6,313,079 B1 | 11/2001 | Murphy | |
| 6,368,359 B1 | 4/2002 | Perry et al. | |
| 6,491,840 B1 * | 12/2002 | Frankenbach et al. | 252/8.91 |
| 6,623,858 B1 * | 9/2003 | Yabe et al. | 428/403 |
| 6,645,392 B2 | 11/2003 | Frankenbach et al. | |
| 6,939,837 B2 | 9/2005 | Noyes et al. | |
| 2001/0020308 A1 | 9/2001 | Murphy | |
| 2001/0025019 A1 * | 9/2001 | Bijl et al. | 510/367 |
| 2001/0034912 A1 | 11/2001 | Kilgour et al. | |
| 2002/0004953 A1 * | 1/2002 | Perry et al. | 8/142 |
| 2002/0023305 A1 * | 2/2002 | Murphy | 8/142 |
| 2002/0115582 A1 * | 8/2002 | Perry et al. | 510/285 |
| 2002/0155966 A1 * | 10/2002 | Murphy et al. | 510/285 |
| 2002/0174493 A1 * | 11/2002 | Perry et al. | 8/142 |
| 2003/0060386 A1 * | 3/2003 | Murphy et al. | 510/285 |
| 2003/0180333 A1 * | 9/2003 | Moaddel et al. | 424/401 |

FOREIGN PATENT DOCUMENTS

| | | |
|---|---|---|
| CN | 1 069 064 A | 2/1993 |
| DE | 2 108 991 A | 8/1972 |
| DE | 37 39 711 A | 6/1989 |
| DE | 41 31 589 A | 4/1993 |
| DE | 296 00 628 U1 | 6/1997 |
| DE | 198 10907 A1 | 9/1999 |
| EP | 0 091 261 A2 | 10/1983 |
| EP | 0 118 625 A2 | 9/1984 |
| EP | 0 182583 A2 | 5/1986 |
| EP | 0410 068 A1 | 1/1991 |
| EP | 0 422 787 A2 | 4/1991 |
| EP | 0 566 240 A1 | 10/1993 |
| EP | 0 679 754 A2 | 11/1995 |
| EP | 0 716 870 A1 | 6/1996 |
| EP | 0 479 146 B1 | 12/1996 |
| EP | 0 767 267 A1 | 4/1997 |
| EP | 0 962519 A1 | 12/1999 |
| EP | 982 023 A2 | 3/2000 |
| EP | 1 041 189 A1 | 10/2000 |
| EP | 1 043 443 A1 | 10/2000 |
| EP | 1 092 803 A1 | 4/2001 |
| FR | 2 268 898 A1 | 11/1975 |
| GB | 1 451 600 A | 10/1976 |
| GB | 1 059 315 A | 5/1978 |
| GB | 2 084 204 A | 4/1982 |
| GB | 2 230 022 A | 10/1990 |
| GB | 2 251 867 A | 7/1992 |
| JP | 1098-798 A2 | 4/1989 |
| JP | 1188-595 A | 7/1989 |
| JP | 2166-198 A | 6/1990 |
| JP | 2202-599 A | 8/1990 |
| JP | 2222-496 A | 9/1990 |
| JP | 3046-300 A2 | 2/1991 |
| JP | 04311799 | 11/1992 |
| JP | 04323299 A | 11/1992 |
| JP | 05051598 A2 | 3/1993 |
| JP | 05239766 A | 9/1993 |
| JP | 08073837 A | 3/1996 |
| JP | 09143497 A | 6/1997 |
| JP | 10-071891 | 1/1998 |
| JP | 11-092784 | 4/1999 |
| JP | 11-323381 | 11/1999 |
| JP | 11-323383 | 11/1999 |
| JP | 00144175 A | 5/2000 |
| JP | 2000-192085 A2 | 7/2000 |
| JP | 00290689 A | 10/2000 |
| SU | 1705444 A1 | 1/1992 |
| WO | WO 82/02218 A1 | 7/1982 |
| WO | WO 94/01227 A1 | 1/1994 |
| WO | WO 96/30471 A2 | 10/1996 |
| WO | WO 97/35061 A1 | 9/1997 |
| WO | WO 98/07405 A1 | 2/1998 |
| WO | WO 98/16615 A1 | 4/1998 |
| WO | WO 99/57358 | 11/1999 |
| WO | WO 00/04221 | 1/2000 |
| WO | WO 00/04222 | 1/2000 |
| WO | WO 00/63340 | 10/2000 |
| WO | WO 01/06051 A1 | 1/2001 |
| WO | WO 01/34613 A1 | 5/2001 |
| WO | WO 01/34706 A1 | 5/2001 |
| WO | WO 01/40567 A1 | 6/2001 |
| WO | WO 01/94678 A1 | 12/2001 |
| WO | WO 01/94681 A1 | 12/2001 |
| WO | WO 01/94684 A1 | 12/2001 |

OTHER PUBLICATIONS

Sarbu et al.; "Non-Fluorous Polymers With Very High Solubility in Supercritical $CO_2$ Down to Low Pressures"; pp. 165-168.
XP 002180807, Dec. 1996, Chemical Abstract.

* cited by examiner

COMPOSITION COMPRISING AN ORGANOSILICONE/DIOL LIPOPHILIC FLUID FOR TREATING OR CLEANING FABRICS

CROSS-REFERENCE TO RELATED APPLICATIONS

This application is a Divisional Application of U.S. application Ser. No. 11/183,546, filed on Jul. 18, 2005, now U.S. Pat. No. 7,439,216 which is a Divisional Application of U.S. application Ser. No. 09/849,843, filed on May 4, 2001, now U.S. Pat. No. 6,939,837 which claims priority under 35 USC 119(e) to U.S. Provisional Application Ser. No. 60/209,250 filed on Jun. 5, 2000.

FIELD OF THE INVENTION

The present invention relates to the composition comprises a lipophilic fluid, a polyalkyleneoxide polysiloxane surfactant, and a second surfactant.

BACKGROUND OF THE INVENTION

For the cleaning of fabric articles consumers have the choice of conventional laundry cleaning or dry cleaning.

Conventional laundry cleaning is carried out with relatively large amounts of water, typically in a washing machine at the consumer's home, or in a dedicated place such as a coin laundry. Although washing machines and laundry detergents have become quite sophisticated, the conventional laundry process still exposes the fabric articles to a risk of dye transfer and shrinkage. A significant portion of fabric articles used by consumers are not suitable for cleaning in a conventional laundry process. Even fabric articles that are considered "washing machine safe" frequently come out of the laundry process badly wrinkled and require ironing.

Dry cleaning processes rely on non-aqueous solvents for cleaning. By avoiding water these processes minimize the risk of shrinkage and wrinkling. The need for handling and recovering large amounts of solvents make dry cleaning processes unsuitable for use in the consumer's home. The need for dedicated dry cleaning operations makes this form of cleaning inconvenient and expensive for the consumer.

Accordingly there is an unmet need for a method for cleaning or treating fabric articles that is safe for a wide range of fabric articles, minimizes shrinkage and wrinkling, and can be adapted to a cost effective use in the consumer's home.

SUMMARY OF THE INVENTION

The present invention provides the composition comprises a lipophilic fluid, a polyalkyleneoxide polysiloxane surfactant, and a second surfactant.

These and other aspects, features and advantages will become apparent to those of ordinary skill in the art from a reading of the following detailed description and the appended claims. All percentages, ratios and proportions herein are by weight, unless otherwise specified. All temperatures are in degrees Celsius (° C.) unless otherwise specified. All measurements are in SI units unless otherwise specified. All documents cited are in relevant part, incorporated herein by reference.

DETAILED DESCRIPTION OF THE INVENTION

Definitions

The term "fabric article" used herein is intended to mean any article that is customarily cleaned in a conventional laundry process or in a dry cleaning process. As such the term encompasses articles of clothing, linen, drapery, and clothing accessories. The term also encompasses other items made in whole or in part of fabric, such as tote bags, furniture covers, tarpaulins and the like.

The term "spraying" and/or "spray" used herein encompasses a means for applying droplets of the cleaning fluid to a fabric article. Typically, the droplets may range in average droplet size from about 100 µm to about 1000 µm. As used herein, the term also encompasses "mist" and/or "misting" and "fog" and/or "fogging", those terms being subclasses of "spray" and/or "spraying" and are on the small side of the average droplet size.

The "spray" may be made by any suitable means known to those in the art. Nonlimiting examples include passing the cleaning fluid through nozzles, atomizers, ultrasonic devices and the like.

The term "lipophilic fluid" used herein is intended to mean any non-aqueous fluid capable of removing sebum, as described in more detail hereinbelow.

The term "textile treatment liquid" used herein is intended to mean any liquid, aqueous or non-aqueous, suitable for cleaning, conditioning or sizing of fabrics.

The lipophilic fluid and the textile treatment liquid will be referred to generically as the "cleaning fluid", although it should be understood that the term encompasses uses other than cleaning, such as conditioning and sizing. Furthermore, optional adjunct ingredients such as surfactants, bleaches, and the like may be added to the "cleaning fluid". That is, adjuncts may be The phrase "dry weight of a fabric article" as used herein means the weight of a fabric article that has no intentionally added fluid weight.

The phrase "absorption capacity of a fabric article" as used herein means the maximum quantity of fluid that can be taken in and retained by a fabric article in its pores and interstices. Absorption capacity of a fabric article is measured in accordance with the following Test Protocol for Measuring Absorption Capacity of a Fabric Article.

Test Protocol for Measuring the Absorption Capacity of a Fabric Article

Step 1: Rinse and dry a reservoir or other container into which a lipophilic fluid will be added. The reservoir is cleaned to free it from all extraneous matter, particularly soaps, detergents and wetting agents.

Step 2: Weigh a "dry" fabric article to be tested to obtain the "dry" fabric article's weight.

Step 3: Pour 2 L of a lipophilic fluid at ~20 C into the reservoir.

Step 4: Place fabric article from Step 2 into the lipophilic fluid-containing reservoir.

Step 5: Agitate the fabric article within the reservoir to ensure no air pockets are left inside the fabric article and it is thoroughly wetted with the lipophilic fluid.

Step 6: Remove the fabric article from the lipophilic fluid-containing reservoir.

Step 7: Unfold the fabric article, if necessary, so that there is no contact between same or opposite fabric article surfaces.

Step 8: Let the fabric article from Step 7 drip until the drop frequency does not exceed 1 drop/sec.

Step 9: Weigh the "wet" fabric article from Step 8 to obtain the "wet" fabric article's weight.

Step 10: Calculate the amount of lipophilic fluid absorbed for the fabric article using the equation below.

$$FA = (W-D)/D * 100$$

where:

FA=fluid absorbed, % (i.e., the absorption capacity of the fabric article in terms of % by dry weight of the fabric article)

W=wet specimen weight, g

D=initial specimen weight, g

By the term "non-immersive" it is meant that essentially all of the fluid is in intimate contact with the fabric articles. There is at most minimal amounts of "free" wash liquor. It is unlike an "immersive" process where the washing fluid is a bath in which the fabric articles are either submerged, as in a conventional vertical axis washing machine, or plunged into, as in a conventional horizontal washing machine. The term "non-immersive" is defined in greater detail according to the following Test Protocol for Non-Immersive Processes. A process in which a fabric article is contacted by a fluid is a non-immersive process when the following Test Protocol is satisfied.

Test Protocol for Non-Immersive Processes

Step 1: Determine absorption capacity of a fabric specimen using Test Protocol for Measuring Absorption Capacity of a Fabric Article, described above.

Step 2: Subject a fabric article to a fluid contacting process such that a quantity of the fluid contacts the fabric article.

Step 3: Place a dry fabric specimen from Step 1 in proximity to the fabric article of Step 2 and move/agitate/tumble the fabric article and fabric specimen such that fluid transfer from the fabric article to the fabric specimen takes place (the fabric article and fabric specimen must achieve the same saturation level).

Step 4: Weigh the fabric specimen from Step 3.

Step 5: Calculate the fluid absorbed by the fabric specimen using the following equation:

$$FA = (W-D)/D * 100$$

where:

FA=fluid absorbed, %

W=wet specimen weight, g

D=initial specimen weight, g

Step 6: Compare the fluid absorbed by the fabric specimen with the absorption capacity of the fabric specimen. The process is non-immersive if the fluid absorbed by the fabric specimen is less than about 0.8 of the absorption capacity of the fabric specimen.

METHOD OF THE PRESENT INVENTION

The method of the present invention comprises one or more of the following steps A-E. The steps may occur at any time during the method. Further, each and every step may be independently repeated one or more times.

The time to complete the method of the present invention can vary quite widely. For example, the method from about 30 seconds to about 30 minutes. More generally, a complete cleaning or fabric treatment operation of fabric articles, from start to end (at which time the fabric articles are ready to wear with the exception of optional ironing) can take from about 5 minutes to about three hours, or even longer, for example, if a low-energy overnight mode of operation is contemplated or if a cleaning operation is to be followed by additional fabric treatment. The total processing time will also vary with the precise appliance design, for example appliance variations having reduced pressure (vacuum) means can help reduce cycle time. In the alternative, embodiments involving longer times may be less desirable for the consumer but may be imposed by energy-saving requirements, which can very from country to country. Typical processes include those taking from about 20 minutes to about two hours in total. The balance of process time apart from the various cleaning fluid application stages, will typically be dedicated to removal and/or finishing.

Conventional prespotting, soaking or pretreating fabric articles prior to cleaning the fabric articles in accordance with the present invention may be performed.

Further, the method of the present invention may be used for treating an unsorted load of fabric articles without substantial damage or dye-transfer between said articles. By "unsorted fabric articles" it is meant that the fabric articles to be treated comprise two or more articles selected from the group consisting of articles having "dry clean only" care labels. In other words, it is one embodiment of the present invention that an apparatus and method of treating using the same apparatus, which clean dry clean only fabrics at the same time, and in the same apparatus, as fabrics which can be water washed.

A. Applying Cleaning Fluid

In accordance with the present invention, the cleaning fluid may be applied to the fabric articles by any suitable means known to those in the art. Nonlimiting examples of application means include spraying, dipping, brushing on, rubbing on and the like. A desirable application means comprises spraying.

It is desirable that the cleaning fluid is applied in manner such that the cleaning fluid uniformly contacts the fabric articles. Such uniformity of cleaning fluid application can be achieved for example by applying a cleaning fluid to fabric articles and then concurrently or subsequently repositioning the fabric articles, such as by tumbling or otherwise moving the fabric articles, to expose non-contacted portions of the fabric articles to the cleaning fluid application or subsequent cleaning fluid application.

However, uniformity of distribution is not absolutely necessary, especially for those fabric care agents that can provide their desired benefit to the fabric article without being uniformly distributed on a fabric article. A nonlimiting example of such a fabric care agent is a perfume.

An effective amount of the cleaning fluid is applied to the fabric articles such that the cleaning fluid provides the desired fabric care benefit to the fabric articles, such as cleaning, conditioning, refreshing, sizing, etc.

The application of the cleaning fluid to the fabric articles may be repeated as necessary. Further, the repositioning (i.e., by way of tumbling) of the fabric articles during and/or between applications of the cleaning fluid is desirable.

It is acceptable to apply a quantity of cleaning fluid to the fabric articles such that a quantity of lipophilic fluid of from about 20% by dry weight of the fabric articles up to the absorption capacity of the fabric articles is applied to the fabric articles.

Since the "absorption capacity" of different fabric articles vary, the amount of cleaning fluid used with the different fabric articles can vary. For example, for fabric articles that have a greater absorption capacity, more cleaning fluid and thus, more lipophilic fluid can be used.

Nonlimiting examples of absorption capacities of fabric articles are described below:

Sample Table for Fabric Absorbency

| Fabric Type | Structure | Average absorbency, % |
|---|---|---|
| Cotton, C61 | Mesh | 165 |
| Cotton, C77 | Knit | 330 |
| Cotton, CW19 | Towel | 480 |
| Polycotton, PC49 | Knit | 170 |
| Polycotton, BC | Corduroy | 200 |
| Polyester, PW18 | knit | 240 |
| Wool, W4 | knit | 330 |
| Wool, W522 | knit | 250 |
| Acrylate, ACR8 | knit | 340 |
| Nylon, N18 | knit | 210 |
| Nylon, N21 | knit | 140 |
| Silk | knit | 190 |

(Absorbency of fabrics determined using the Test Protocol for Measuring Absorption Capacity of a Fabric Article as described hereinabove.

The amount of lipophilic fluid evenly distributed onto the fabric article(s) will depend on a wide range of factors, such as, type of fluid, its affinity to fabrics, garment construction, soil load to be removed, etc. For example, typically, fine, thin garments will require lesser amount of cleaning fluid than heavier garments. However, the quantity of lipophilic fluid is such, that there is none or minimal amounts of lipophilic fluid in excess of the absorption capacity of the fabric article(s) being treated, which is typically about 150%, by dry weight of the fabric article(s). Typically, in a domestic situation the amount of lipophilic fluid is based on weight, type of garments, soil amount, and can be controlled by user-selectable interface choosing the most appropriate cycle, much in the same fashion as a consumer would on a conventional washing machine.

For example, if a consumer desires to refresh a fabric article, such as remove odors, such as smoke odors, pet odors, etc, wrinkles and the like, rather than clean soil and/or stains from the fabric article, then the consumer preferably uses less cleaning fluid, and thus less lipophilic fluid, compared to a cleaning process, in a apply/remove (i.e., spray/spin) multi-step cleaning fluid application process because the amount of cleaning fluid, and thus lipophilic fluid, need not reach about the absorption capacity of the fabric article in order to deliver the desired benefits. On the other hand, if a consumer desires to clean soil and/or stains from the fabric article, then the consumer preferably uses more cleaning fluid, and thus more lipophilic fluid, compared to a refreshing process, in a single spray cleaning fluid application process while tumbling the fabric article to facilitate uniform distribution of the cleaning fluid on the fabric article because the amount of cleaning fluid, and thus lipophilic fluid, for cleaning purposes preferably reaches about the absorption capacity of the fabric article.

Either process described above may utilize an apply/remove multi-step cleaning fluid application process.

In light of the foregoing, if cleaning of the fabric articles is desired (i.e., soil and/or stain removal) then it is desirable to apply a quantity of cleaning fluid such that a quantity of lipophilic fluid of from about 75% of the absorption capacity up to the absorption capacity of the fabric articles is applied to the fabric articles. Further, it is highly desirable to tumble the fabric articles during the application of the cleaning fluid.

Further, if refreshing and/or finishing of the fabric articles is desired (i.e., sizing, conditioning, perfuming, etc.) then it is desirable to apply a quantity of cleaning fluid such that a quantity of lipophilic fluid of from about 20% by dry weight of the fabric articles to less than 75% of the absorption capacity of the fabric articles is applied to the fabric articles.

B. Mechanically Removing Cleaning Fluid

In accordance with the present invention, lipophilic fluid present on the fabric articles needs to be mechanically removed. The amount of lipophilic fluid mechanically removed varies depending on the quantity of lipophilic fluid present on the fabric articles, the type of fabric articles, and the like. It is desirable that a portion, such as greater than 5%, or greater than 10% by dry weight of the fabric articles, of lipophilic fluid remains on the fabric articles after such removal.

Mechanically removing the lipophilic fluid from the fabric articles is a desirable way of removing the lipophilic fluid. The mechanical removal is a non-distillative removal of the lipophilic fluid. Nonlimiting examples of non-distillative removal include applying a force to the lipophilic fluid-containing fabric articles such that the lipophilic fluid is removed from the fabric articles. Nonlimiting examples of forces that can be used include squeezing, pressing, or otherwise flattening the fabric articles to decrease the quantity of lipophilic fluid on the fabric articles.

One suitable embodiment includes an expandable bladder that can expand to squeeze and/or press the fabric articles.

Another suitable embodiment includes the a sponge or the like than can contact the fabric articles and absorb a quantity of lipophilic fluid.

Yet another suitable embodiment includes spinning/rotating the fabric articles at a high speed of rotation such that a quantity of lipophilic fluid is removed from the fabric articles. It is desirable to spin the fabric articles at a centrifugal acceleration of from about 1050 m/s$^2$ to about 4450 m/s$^2$.

It is desirable that a quantity of lipophilic fluid present on the fabric articles is mechanically removed such that the quantity of lipophilic fluid remaining on the fabric articles after the removal step is from about 20% to about 100% by dry weight of the fabric articles.

C. Evaporatively Removing Cleaning Fluid

In addition to the mechanical removal of lipophilic fluid present on the fabric articles, the lipophilic fluid may be evaporatively removed. The amount of lipophilic fluid evaporatively removed varies depending on the quantity of lipophilic fluid present on the fabric articles, other materials in addition to the lipophilic fluid present on the fabric articles, the type of fabric articles, and the like.

Evaportatively removing the lipophilic fluid from the fabric articles is a desirable way to remove a quantity of lipophilic fluid that remains on the fabric articles after the mechanical removal step.

The evaporative removal step can be considered a "drying" step. The purpose of the evaporative removal step is to remove a quantity of lipophilic fluid from the fabric articles such that the fabric articles are "dry to the touch".

It is desirable that a quantity of lipophilic fluid is removed from the fabric articles by evaporative removal such that a quantity of lipophilic fluid of less than about 5%, or less than about 3% to about 0% by dry weight of the fabric articles remains on the fabric articles.

Physical conditions and/or chemical agents/conditions may be used to facilitate the evaporative removal of the lipophilic fluid. For example, drying aids (i.e., any chemical agent that evaporates more readily than the lipophilic fluid used in the method that reduce the time for drying of the fabric articles treated in the method of the present invention). Nonlimiting examples of such drying aids include alcohols, hydrofluoroethers, esters and mixtures thereof. Additional conditions that can be used to reduce the time for drying of the fabric articles include, but are not limited to, contacting the fabric articles with heated gas and/or circulating gas, and/or repositioning the fabric articles during the evaporative removal step.

The heated gas may be air, or may be an inert gas such as nitrogen, depending on the cleaning fluid being evaporatively removed. This step may be carried out at atmospheric pressure or at a reduced pressure. Operating at a reduced pressure permits evaporative removal at a lower temperature.

It is desirable to select conditions (gas temperature, pressure, flow rate) such that the evaporative removal step be completed in less than an hour, preferably in less than 45 minutes.

Upon the completion of the evaporative removal step the fabric articles will be ready for their intended use.

D. Contracting with Impinging Gas

In accordance with the present invention, the fabric articles to be treated and/or cleaned may be contacted with an impinging gas at any time during the method of the present invention.

It is desirable that the fabric articles are contacted by an impinging gas at least prior to applying the cleaning fluid. The impinging gas facilitates the removal particulate soils from the fabric articles. Particulate soils can be successfully removed using gas flow. Particulate soils include any soil that is comprised of discrete particles. Nonlimiting examples of such particulate soils include clay, dust, dried mud, sand, cat fur, skin flakes or scales, dander, dandruff, hair from people or pets, grass seeds, pollen, burrs, and/or similar animal, mineral or vegetable matter which is insoluble in water.

By utilizing the impinging gas, "demand" on chemicals in the process for removing such particulate soils is reduced.

Typically, the impinging gas is flow from a gas source at a rate of from about 10 l/s to about 70 l/s and the gas contacts the fabric articles at a velocity of from about 1 m/s to about 155 m/s. It is desirable to mechanically agitate the fabric articles while the gas impinges on the fabric articles. Further, it is desirable to remove the gas, and particulate soils in the gas from the fabric articles at a rate sufficient to prevent the removed particulate soils from re-depositing upon the fabric articles.

In one embodiment of the present invention the gas is selected from the group consisting of air, nitrogen, ozone, oxygen, argon, helium, neon, xenon, and mixtures thereof, more preferably air, nitrogen, ozone, oxygen, argon, helium, and mixtures thereof, even more preferably still air, ozone, nitrogen, and mixtures thereof.

In another embodiment of the present invention the gas used in the method can be varied over time. For example air could be used at the start of the process, a mixture of air and ozone used in the middle stages of the process and air or nitrogen could be used at the end.

The gas used may be of any suitable temperature or humidity. Heat could be supplied to the gas electrically or by passing the gas over a gas flame, such as, is done in a conventional gas dryer. However, room temperature and humidity gas are preferred.

In one embodiment of the present invention two or more gases could be mixed in a mixing chamber before being used in the process. In another aspect of this embodiment of the present invention the gases could be delivered concurrently through different entry points and mix in-situ in the walled vessel. In another aspect of this embodiment of the present invention the gases supplied could exist as mixture and would not require any mixing chamber to achieve the required mixture of gas for the process.

In one embodiment of the present invention the gas could be available from storage, such as from pressurized containers. Alternatively, the gas used in the process could be obtained from the location where the process and device occur. For example, a pump, blower, or the like, may be used to supply air from the surrounding atmosphere for the process of the invention. A combination of gas available from storage and from the atmosphere is also envisioned.

In another embodiment of the present invention the gas can be obtained from a compressor. The compressor may be any compressor suitable for providing gas or gases, provided that they supply the gas to the apparatus within the required velocity and flow rate ranges. The compressors are linked to the gas inlet(s) by an appropriate fixture, such as a hose, pipe, tap, fixture or combinations thereof, to provide the inlet(s) with the gas or gases within the required velocity and flow rate ranges. Some typical compressors, which are suitable for providing gas or gases, include rotary screw compressors or two-stage electrical compressor. Another suitable type of compressor is the so-called "acoustical compressor", such as those described in U.S. Pat. Nos. 5,020,977, 5,051,066, 5,167,124, 5,319,938, 5,515,684, 5,231,337, and 5,357,757, all of which are incorporated herein by reference. Typically, an acoustical compressor operates in the following fashion: A gas is drawn into a pulse chamber, such as air from the atmosphere, compressed, and then discharged as a high-pressure gas. The gas is compressed by the compressor sweeping a localized region of electromagnetic, for example microwaves, laser, infrared, radio etc, or ultrasonic energy through the gas in the pulse chamber at the speed of sound. This sweeping of the pulse chamber creates and maintain a high-pressure acoustic pulse in the gas. These acoustical compressors have many advantages over conventional compressors. For example, they have no moving parts besides the valves, operate without oil, and are much smaller than comparable conventional compressors.

In one embodiment of the present invention the gas is provided from a gas source at a rate of from about 10 l/s to about 70 l/s, more preferably, about 20 l/s to about 42 l/s, even more preferably about 25 l/s to about 30 l/s. The gas flow rate is measure by a flow meter place in the internal space of the vessel close to where the gas enters the vessel containing the clothes.

In one embodiment of the present invention the gas contacts the fabric articles at a velocity of from about 1 m/s to about 155 m/s, more preferably, about 50 m/s to about 105 m/s even more preferably about 75 m/s to about 105 m/s. The gas velocity is measure by a flow meter place in the internal space of the vessel close to where the gas enters the vessel containing the clothes.

The velocity at which the gas contacts the fabric articles and the flow rate of the gas are critical parameters. For example insufficient velocity, means that the particulates are not removed from the fabric articles. Too great a velocity and the fabric articles are disrupted such that the fabric articles cannot be agitated and the particulate soils cannot be removed. Similarly, insufficient flow rate of the gas means that any particulate soils removed remain and can be re-deposited on the fabric article after cleaning.

E. Applying Finishing Agent-Containing Composition

In accordance with the present invention, a finishing agent-containing composition may be applied to the fabric articles.

It is desirable that the application of the finishing agent-containing composition to the fabric articles occurs after the mechanical removal step. Further, it is desirable that the application of the finishing agent-containing composition occurs prior to any evaporative removal step. The purpose of the finishing agent-containing composition is to apply a finishing agent to the fabric articles such that the finishing agent remains on the fabric articles after the method of the present invention.

The finishing agent-containing composition may be applied to the fabric articles at any amount. The quantity of finishing agent-containing composition applied to the fabric articles depends upon the type of fabric articles, the purpose of the finishing agent (i.e., sizing, perfuming, softening, deodorizing). Typically, a quantity of the finishing agent-containing composition of from about 0.1% to about 100%, more typically from about 0.5% to about 50%, most typically from about 1% to about 10% by dry weight of the fabric articles is applied to the fabric articles.

Depending upon the finishing agent and its purpose, the finishing agent-containing composition may be applied uniformly to the fabric articles.

The finishing agent-containing composition typically comprises a finishing agent selected from the group consisting of: fabric softening agents or actives, perfumes, hand-modifying agents, properfumes, fabric softening agents or actives, anti-static agents, sizing agents, optical brighteners, odor control agents, soil release polymers, hand-modifying agents, insect and/or moth repellent agents, antimicrobial agents, odor neutralizing agents and mixtures thereof.

The fabric softening agents or actives typically comprise a cationic moiety, more typically a quaternary ammonium salt, preferably selected from the group consisting of: N,N-dimethyl-N,N-di(tallowyloxyethyl) ammonium methylsulfate, N-methyl-N-hydroxyethyl-N,N-di(canoyloxyethyl) ammonium methylsulfate and mixtures thereof.

The hand-modifying agents typically comprise a polyethylene polymer.

One especially preferred finishing agent-containing composition comprises a mix of DPGDME (DiPropyleneGlycol DiMethylEther) N,N-di(tallowoyl-oxy-ethyl)-N,N-dimethyl ammonium chloride and a perfume.

F. Collecting Lipophilic Fluid

The lipophilic fluid removed from the fabric articles may be collected by any suitable means known to those in the art. The collected lipophilic fluid may be reused at a later time or may be stored until proper removal of the lipophilic fluid is arranged.

G. Reusing Lipophilic Fluid

The lipophilic fluid removed from the fabric articles may be reused. It is desirable that any soils present in the lipophilic fluid are removed prior to reapplying the lipophilic fluid to the fabric articles.

For the lipophilic fluid to be reused, it is desirable that the lipophilic fluid is processed to remove any soils as well as any water that are present in the lipophilic fluid. Nonlimiting examples of processing steps include filtering the lipophilic fluid, such as through an absorbent material, preferably an absorbent material that releasably captures water from the lipophilic fluid, other separation and/or filtering techniques, such as exposing the lipophilic fluid to an electric field.

Cleaning Fluid

A important aspect of the present invention is that fabric cleaning or treatment is accomplished with relatively small amounts of cleaning fluid. The amount of cleaning fluid should be just sufficient to completely and uniformly wet the fabric articles. The amount of cleaning fluid needed to uniformly wet fabrics will depend on factors such as the nature of the fibers used in the fabric (whether wool, silk, cotton, polyester, nylon, etc.), the denier of the fiber used in the fabric, the closeness of the weave, etc.

For example, the amount of cleaning fluid applied to a fabric article will be at least about 20% by dry weight of the fabric articles, and not more than about 200% by weight of the fabric articles. In many applications an amount of cleaning fluid of from about 35% to about 70% by weight of the fabric articles is preferred, with an amount of about 50% by weight of the fabric articles being particularly preferred. However, it is to be understood that the amount of cleaning fluid applied to a fabric article will vary depending upon the absorption capacity of the fabric articles to be treated.

The cleaning fluid comprises from at least about 50% to about 100% by weight of cleaning fluid of a lipophilic fluid and optionally from about 0% to about 50% by weight of cleaning fluid of an adjunct ingredient. The cleaning fluid can comprise one or more liquid phases and can be in the form of an emulsion or microemulsion form. The lipophilic fluid and adjunct ingredients will now be explained in more detail.

The total amount of cleaning fluid used in one treatment cycle, that is the total amount of cleaning fluid applied to and removed from the fabric articles in the process of the present invention from the time the process is commenced until it is finished is from about 10% to about 1500%, even more preferably from about 10% to about 1000%, even more preferably from about 10% to about 500%, even more preferably from about 30% to about 400%, even more preferably from about 80% to about 300%, even more preferably still from about 100% to about 200% by weight of the dry fabric articles.

The amount of cleaning fluid which is used in the first application of cleaning fluid in a treatment process is from about 10% to about 500%, more preferably from about 20% to about 200%, even more preferably from about 35% to about 150%, even more preferably still from about 50% to about 120% by weight of the dry fabric articles.

The amount of cleaning fluid which is used in any application other than the first application of cleaning fluid in a treatment process is from about 10% to about 200%, more preferably from about 10% to about 100%, even more preferably from about 20% to about 80%, even more preferably still from about 25% to about 60% by weight of the dry fabric articles.

One suitable cleaning fluid composition comprises about 85% to 90% by weight of lipophilic fluid, preferably a silicone, such as cyclopentasiloxane, and from about 15% to about 10% of adjunct ingredients.

Lipophilic Fluid:

The lipophilic fluid herein is one having a liquid phase present under operating conditions of the appliance. In general such a fluid can be fully liquid at ambient temperature and pressure, can be an easily melted solid, e.g., one which becomes liquid at temperatures in the range from about 0 deg. C. to about 60 deg. C., or can comprise a mixture of liquid and vapor phases at ambient temperatures and pressures, e.g., at 25 deg. C. and 1 atm. pressure. Thus, the essential lipohilic fluid is not a compressible gas such as carbon dioxide. It is preferred that the lipophilic fluid herein be inflammable or, have relatively high flash points and/or low VOC characteristics, these terms having their conventional meanings as used in the dry cleaning industry, to equal or, preferably, exceed the characteristics of known conventional dry cleaning fluids. Moreover, suitable cleaning fluids herein are readily flowable and nonviscous. In general, cleaning fluid herein are required to be fluids capable of at least partially dissolving sebum or body soil as defined in the test hereinafter. Mixtures of lipophilic fluid are also suitable, and provided that the requirements of the test are met, the lipophilic fluid can include any fraction of dry-cleaning solvents, especially newer types including fluorinated solvents, or perfluorinated amines. Some perfluorinated amines such as perfluorotributylamines while unsuitable for use as lipohilic fluid may be present as one of many possible adjuncts present in the lipohilic cleaning fluid; Other suitable lipohilic fluids include diol solvent systems e.g., higher diols such as C6- or C8- or higher diols; organosilicon solvents including both cyclic and acyclic types, and the like; and mixtures thereof. A preferred group of nonaqueous liquids suitable for incorporation as the major component of the cleaning fluid includes low-volatility nonfluorinated organics, silicones, especially those other than aminofunctional silicones, and mixtures thereof. Low volatility nonfluorinated organics include for example OLEAN and other polyol esters, or certain relatively nonvolatile biodegradable mid-chain branched petroleum fractions. Suitable silicones for use as a major component, e.g., more than 50%, of the cleaning fluid include cyclopentasiloxane, sometimes termed "D5", or linear analogs having approximately similar volatility, optionally complemented by other compatible silicones. Suitable silicones are well known in the literature, see, for example, Kirk Othmer's Encyclopedia of Chemical Technology, and are available from a number of commercial sources, including General Electric, Toshiba Silicone, Bayer, and Dow Corning. Other suitable fluids are commercially available from Procter & Gamble or from Dow Chemical and other suppliers. For example one suitable silicone is SF-1528 available from GE silicone fluids. It is worth noting that SF-1528 fluid is 90% cyclopentasiloxane (D5).

Qualification of Lipophilic Fluid and Lipophilic Fluid Test (LF Test).

Any non-aqueous fluid that is both capable of meeting known requirements for a dry-cleaning fluid (e.g, flash point etc.) and is capable of at least partially dissolving sebum, as indicated by the test method described below, is suitable as a lipophilic fluid herein. The ability of a particular material to remove sebum can be measured by any known technique. As a general guideline, perfluorobutylamine (Fluorinert FC-43®) on its own (with or without adjuncts) is a reference material which by definition unsuitable as the lipophilic fluid herein (it is essentially a nonsolvent) while D5 has suitable sebum-dissolving properties and dissolves sebum.

The following is the method for investigating and qualifying other materials, e.g., other low-viscosity, free-flowing silicones, for use as the lipohilic cleaning fluid. The method uses commercially available Crisco® canola oil, oleic acid (95% pure, available from Sigma Aldrich Co.) and squalene (99% pure, available from J.T. Baker) as model soils for sebum. The test materials should be substantially anhydrous and free from any added adjuncts, or other materials during evaluation.

Prepare three vials. Place 1.0 g of canola oil in the first; in a second vial place 1.0 g of the oleic acid (95%), and in a third and final vial place 1.0 g of the squalene (99.9%). To each vial add 1 g of the fluid to be tested for lipophilicity. Separately mix at room temperature and pressure each vial containing the lipophilic soil and the fluid to be tested for 20 seconds on a standard vortex mixer at maximum setting. Place vials on the bench and allow to settle for 15 minutes at room temperature and pressure. If, upon standing, a single phase is formed in any of the vials containing lipophilic soils, then the fluid qualifies as suitable for use as a "lipophilic fluid" in accordance with the invention. However, if two or more separate layers are formed in all three vials, then the amount of fluid dissolved in the oil phase will need to be further determined before rejecting or accepting the fluid as qualified.

In such a case, with a syringe, carefully extract a 200 microliter sample from each layer in each vial. The syringe-extracted layer samples are placed in GC autosampler vials and subjected to conventional GC analysis after determining the retention time of calibration samples of each of the three models soils and the fluid being tested. If more than 1% of the test fluid by GC, preferably greater, is found to be present in any one of the layers which consists of the oleic acid, canola oil or squalene layer, then the test fluid is also qualified for use as a lipophilic fluid. If needed, the method can be further calibrated using heptacosafluorotributylamine, i.e., Fluorinert FC-43 (fail) and cyclopentasiloxane (pass).

A suitable GC is a Hewlett Packard Gas Chromatograph HP5890 Series II equipped with a split/splitless injector and FID. A suitable column used in determining the amount of lipophilic fluid present is a J&W Scientific capillary column DB-1HT, 30 meter, 0.25 mm id, 0.1 um film thickness cat#1221131. The GC is suitably operated under the following conditions:

Carrier Gas: Hydrogen
Column Head Pressure: 9 psi
Flows: Column Flow @ ~1.5 ml/min.
Split Vent @ ~250-500 ml/min.
Septum Purge @ 1 ml/min.
Injection: HP 7673 Autosampler, 10 ul syringe, 1 ul injection
Injector Temperature: 350° C.
Detector Temperature: 380° C.
Oven Temperature Program: initial 60° C. hold 1 min.
rate 25° C./min.
final 380° C. hold 30 min.

Preferred lipophilic fluids suitable for use herein can further be qualified for use on the basis of having an excellent garment care profile. Garment care profile testing is well known in the art and involves testing a fluid to be qualified using a wide range of garment or fabric article components, including fabrics, threads and elastics used in seams, etc., and a range of buttons. Preferred lipophilic fluids for use herein have an excellent garment care profile, for example they have a good shrinkage or fabric puckering profile and do not appreciably damage plastic buttons. For purposes of garment care testing or other qualification, e.g., flammability, a lipophilic fluid for use in the cleaning fluid can be present in a mixture, e.g., with water, at approximately the ratio to be used in the final cleaning fluid which will come into contact with fabric articles in the appliance. Certain materials which in sebum removal qualify for use as lipophilic fluids, for example ethyl lactate, can be quite objectionable in their tendency to dissolve buttons, and if such a material is to be used in the cleaning fluid, it will be formulated with water and/or other solvents such that the overall mix is not substantially damaging to buttons. Other lipophilic fluids, D5, for example, meets the garment care requirements quite admirably. Some suitable lipophilic fluids may be found in granted U.S. Pat. Nos. 5,865,852; 5,942,007; 6,042,617; 6,042,618; 6,056,789; 6,059,845; and 6,063,135 which are incorporated herein by reference.

Lipophilic solvents can include linear and cyclic polysiloxanes, hydrocarbons and chlorinated hydrocarbons. More preferred are the linear and cyclic polysiloxanes and hydrocarbons of the glycol ether, acetate ester, lactate ester families. Preferred lipophilic solvents include cyclic siloxanes having a boiling point at 760 mm Hg. of below about 250° C. Specifically preferred cyclic siloxanes for use in this invention are octamethylcyclotetrasiloxane, decamethylcyclopentasiloxane, and dodecamethylcyclohexasiloxane. Preferably, the cyclic siloxane comprises decamethylcyclopentasiloxane (D5, pentamer) and is substantially free of octamethylcyclotetrasiloxane (tetramer) and dodecamethylcyclohexasiloxane (hexamer).

However, it should be understood that useful cyclic siloxane mixtures might contain, in addition to the preferred cyclic siloxanes, minor amounts of other cyclic siloxanes including octamethylcyclotetrasiloxane and hexamethylcyclotrisiloxane or higher cyclics such as tetradecamethylcycloheptasiloxane. Generally the amount of these other cyclic siloxanes in useful cyclic siloxane mixtures will be less than about 10 percent based on the total weight of the mixture. The industry standard for cyclic siloxane mixtures is that such mixtures comprise less than about 1% by weight of the mixture of octamethylcyclotetrasiloxane.

Accordingly, the lipophilic fluid of the present invention preferably comprises more than about 50%, more preferably more than about 75%, even more preferably at least about 90%, most preferably at least about 95% by weight of the lipophilic fluid of decamethylcyclopentasiloxane. Alternatively, the lipophilic fluid may comprise siloxanes which are a mixture of cyclic siloxanes having more than about 50%, preferably more than about 75%, more preferably at least about 90%, most preferably at least about 95% up to about 100% by weight of the mixture of decamethylcyclopentasiloxane and less than about 10%, preferably less than about 5%, more preferably less than about 2%, even more preferably less than about 1%, most preferably less than about 0.5% to about 0% by weight of the mixture of octamethylcyclotetrasiloxane and/or dodecamethylcyclohexasiloxane.

In addition to the above lipophilic solvents, carbon dioxide-philic surfactants can be included in the lipophilic fluid of the present invention. Nonlimiting examples of such carbon dioxide-philic surfactants are described in U.S. Pat. Nos. 5,977,045, 5,683,977, 5,683,473 and 5,676,705.

If the lipophilic fluid of the present invention comprises a carbon dioxide-philic surfactant, such surfactant preferably is present at a level of from about 0.001% to about 10% by weight of the lipophilic fluid and preferably has a structure selected from the group consisting of:

a) $[AB]_y$ wherein A is a repeating dimethyl siloxane unit:

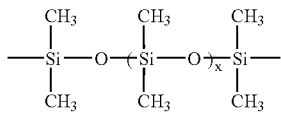

wherein x=0-30; B is a $CO_2$-phobic group represented by

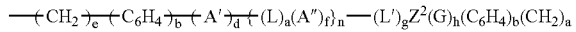

wherein a is 1-30; b is 0 or 1; $C_6H_4$ is unsubstituted or substituted with a $C_{1-10}$ alkylene or alkenylene branched or straight and A' and A" are each independently a linking moiety representing an ester, a keto, an ether, a thio, an amido, an amino, a $C_{1-4}$ fluoroalkylene, a $C_{1-4}$ fluoroalkenylene, a branched or straight chain polyalkylene oxide, a phosphato, a sulfonyl, a sulfate, an ammonium, a lactam and mixtures thereof; d is 0 or 1; L and L' are each independently a $C_{1-30}$ straight chained or branched alkylene or alkenylene or an aryl which is unsubstituted or substituted and mixtures thereof; e is 0-3; f is 0 or 1; n is 0-10; g is 0-3; o is 0-5; $Z^2$ is a hydrogen, a carboxylic acid, a hydroxy, a phosphato, a phosphato ester, a sulfonyl, a sulfonate, a sulfate, a branched or straight-chained polyalkylene oxide, a nitryl, a glyceryl, an aryl unsubstituted or substituted with a $C_{1-30}$ alkylene or alkenylene, a carbohydrate unsubstituted or substituted with a $C_{1-10}$ alkylene or alkenylene or an ammonium; G is an anion or cation selected from $H^+$, $Na^+$, $Li^+$, $K^+$, $NH_4^+$, $Ca^{2+}$, $Mg^{2+}$, $Cl^-$, $Br^-$, $I^-$, mesylate or tosylate; h is 0-3; y is 2-100; wherein A is terminated with hydrogen and B is terminated with an allyl group.

b) $MD_xD^*_yM$ wherein M is a trimethylsiloxyl end group, $D_x$ is a dimethylsiloxyl backbone which is $CO_2$-philic and $D^*_y$ is one or more methylsiloxyl groups which are substituted with a $CO_2$-phobic R or R' group and mixtures of R and R', wherein R and R' are each independently defined in the formula:

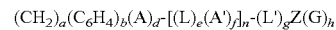

wherein a is 1-30; b is 0 or 1; $C_6H_4$ is unsubstituted or substituted with a $C_{1-10}$ alkyl or alkenyl, and A and A' are each independently a linking moiety representing an ester, a keto, an ether, a thio, an amido, an amino, a $C_{1-4}$ fluoroalkyl, a $C_{1-4}$ fluoroalkenyl, a branched or straight chain polyalkylene oxide, a phosphate, a sulfonyl, a sulfate, an ammonium, and mixtures thereof; d is 0 or 1; L and L' are each independently a $C_{1-30}$ straight chained or branched alkyl or alkenyl or an aryl which is unsubstituted or substituted; e is 0-3; f is 0 or 1; n is 0-10; g is 0-3; o is 0-5; Z is a hydrogen, a carboxylic acid, a hydroxy, a phosphato, a phosphate ester, a sulfonyl, a sulfonate, a sulfate, a branched or straight-chained polyalkylene oxide, a nitryl, a glyceryl, an aryl unsubstituted or substituted with a $C_{1-30}$ alkyl or alkenyl, a carbohydrate unsubstituted or substituted with a $C_{1-10}$ alkyl or alkenyl or an ammonium; G is an anion or cation selected from $H^+$, $Na^+$, $Li^+$, $K^+$, $NH_4^+$, $Ca^{2+}$, $Mg^{2+}$, $Cl^-$, $Br^-$, $I^-$, mesylate or tosylate; h is 0-3;

c) $\{(CX_3(CX_2)_a(CH_2)_b)_c(A)_d\text{-}\{(L)_e\text{-}(A')_f\}_n\text{-}(L')_g\}_oZ^2(G)_h$ wherein X is F, Cl, Br, I or mixtures thereof; a is 1-30, b is 0-5, c is 1-5, A and A' are each independently a linking moiety representing an ester, keto, an ether, a thio, an amido, an amino, a $C_{1-4}$ flouroalkenylene, a $C_{1-4}$ flouralkenylene, a branched or straight chain polyalkylene oxide, a phosphate, sulfonyl, a sulfate, an ammonium, or mixtures thereof; d is 0 or 1, L and L' are each independently a $C_{1-30}$ straight chained or branched alkylene or alkenylene or a phenylene which is unsubstituted or substituted or mixtures thereof; e is 0-3, f is 0 or 1, n is 0-10, g is 0-3; o is 0-5, $Z^2$ is selected from the group consisting of a hydrogen, a carboxylic acid, a hydroxy, a phosphato, a phosphato ester, a sulfonyl, a sulfonate, a sulfate, a branched or straight-chained polyalkylene oxide, a nitryl, a glyceryl, phenylene unsubstituted or substituted with a C1-30 alkylene or alkenylene, a carbohydrate unsubstituted or substituted with a C1-10 alkylene or alkenylene and an ammonium; G is an ion selected from the group consisting of H+, Na+, Li+, K+, NH4+, Ca+2, Mg+2, Cl−, Br−, I−, mesylate, and tosylate, and h is 0-3, d) $\{H-[CH(R^4)-CH(R^5)-O]_i-(A)_d-\{(L)_e-(A')_f\}_n-(L')_g\}_o Z^2(G)_h$ wherein $R^4$ and $R^5$ each represent a hydrogen, a $C_{1-5}$ straight chained or branched alkyl or alkyl oxide or mixtures thereof; i is 1 to 50; A, A', d, L, L', e, f, n, g, o, $Z^2$, G and h are as defined above;

e) $\{[CX_3(XO)_r(T)_s]_c(A)_d-\{(L)_e(A')_f\}_n(L')_g\}_o Z^2(G)_h$ wherein XO is a halogenated alkylene oxide having a $C_{1-6}$ straight or branched halocarbon; r is 1-30; T is a straight chained or branched haloalkylene or halophenylene; s is 0-5; X, A, A', c, d, L, L', e, f, n, g, o, $Z^2$, G and h are as defined above; and f) mixtures thereof.

Adjunct Ingredients

Adjunct materials can vary widely and can be used at widely ranging levels. For example, detersive enzymes such as proteases, amylases, cellulases, lipases and the like as well as bleach catalysts including the macrocyclic types having manganese or similar transition metals all useful in laundry and cleaning products can be used herein at very low, or less commonly, higher levels. Adjunct materials which are catalytic, for example enzymes, can be used in "forward" or "reverse" modes, a discovery independently useful from the specific appliances of the present invention. For example, a lipolase or other hydrolase may be used, optionally in the presence of alcohols as adjuncts, to convert fatty acids to esters, thereby increasing their solubility in the lipohilic cleaning fluid. This is a "reverse" operation, in contrast with the normal use of this hydrolase in water to convert a less water soluble fatty ester to a more water-soluble material. In any event, any adjunct ingredient must be suitable for use in combination with the lipophilic fluid.

Some suitable cleaning additives include, but are not limited to, builders, surfactants, enzymes, bleach activators, bleach catalysts, bleach boosters, bleaches, alkalinity sources, antibacterial agents, colorants, perfumes, pro-perfumes, finishing aids, lime soap dispersants, odor control agents, odor neutralizers, polymeric dye transfer inhibiting agents, crystal growth inhibitors, photobleaches, heavy metal ion sequestrants, anti-tarnishing agents, anti-microbial agents, anti-oxidants, anti-redeposition agents, soil release polymers, electrolytes, pH modifiers, thickeners, abrasives, divalent or trivalent ions, metal ion salts, enzyme stabilizers, corrosion inhibitors, diamines or polyamines and/or their alkoxylates, suds stabilizing polymers, solvents, process aids, fabric softening agents, optical brighteners, hydrotropes, suds or foam suppressors, suds or foam boosters and mixtures thereof.

The term "surfactant" conventionally refers to materials which are surface-active in water. Some illustrative surfactants include nonionic, cationic and silicone surfactants as used in conventional aqueous detergent systems. Suitable nonionic surfactants include, but are not limited to:

a) Polyethylene oxide condensates of nonyl phenol and myristyl alcohol, such as in U.S. Pat. No. 4,685,930 Kasprzak; and b) fatty alcohol ethoxylates, R—$(OCH_2CH_2)_a$OH a=1 to 100, typically 12-40, R=hydrocarbon residue 8 to 20 C atoms, typically linear alkyl. Examples polyoxyethylene lauryl ether, with 4 or 23 oxyethylene groups; polyoxyethylene cetyl ether with 2, 10 or 20 oxyethylene groups; polyoxyethylene stearyl ether, with 2, 10, 20, 21 or 100 oxyethylene groups; polyoxyethylene (2), (10) oleyl ether, with 2 or 10 oxyethylene groups. Commercially available examples include, but are not limited to: ALFONIC, BRIJ, GENAPOL, NEODOL, SURFONIC, TRYCOL. See also U.S. Pat. No. 6,013,683 Hill et al.

Suitable cationic surfactants include, but are not limited to dialkyldimethylammonium salts having the formula:

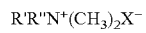

$$R'R''N^+(CH_3)_2 X^-$$

Where each R'R" is independently selected from the group consisting of 12-30 C atoms or derived from tallow, coconut oil or soy, X=Cl or Br, Examples include: didodecyldimethylammonium bromide (DDAB), dihexadecyldimethyl ammonium chloride, dihexadecyldimethyl ammonium bromide, dioctadecyldimethyl ammonium chloride, dieicosyldimethyl ammonium chloride, didocosyldimethyl ammonium chloride, dicoconutdimethyl ammonium chloride, ditallowdimethyl ammonium bromide (DTAB). Commercially available examples include, but are not limited to: ADOGEN, ARQUAD, TOMAH, VARIQUAT. See also U.S. Pat. No. 6,013,683 Hill et al., Suitable silicone surfactants include, but are not limited to the polyalkyleneoxide polysiloxanes having a dimethyl polysiloxane hydrophobic moiety and one or more hydrophilic polyalkylene side chains and have the general formula:

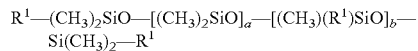

$$R^1-(CH_3)_2SiO-[(CH_3)_2SiO]_a-[(CH_3)(R^1)SiO]_b-Si(CH_3)_2-R^1$$

wherein a+b are from about 1 to about 50, preferably from about 3 to about 30, more preferably from about 10 to about 25, and each $R^1$ is the same or different and is selected from the group consisting of methyl and a poly(ethyleneoxide/propyleneoxide) copolymer group having the general formula:

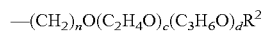

$$-(CH_2)_n O(C_2H_4O)_c(C_3H_6O)_d R^2$$

with at least one $R^1$ being a poly(ethyleneoxide/propyleneoxide) copolymer group, and wherein n is 3 or 4, preferably 3; total c (for all polyalkyleneoxy side groups) has a value of from 1 to about 100, preferably from about 6 to about 100; total d is from 0 to about 14, preferably from 0 to about 3; and more preferably d is 0; total c+d has a value of from about 5 to about 150, preferably from about 9 to about 100 and each $R^2$ is the same or different and is selected from the group consisting of hydrogen, an alkyl having 1 to 4 carbon atoms, and an acetyl group, preferably hydrogen and methyl group. Examples of these surfactants may be found in U.S. Pat. No. 5,705,562 Hill and U.S. Pat. No. 5,707,613 Hill, both of which are incorporated herein by reference.

Examples of this type of surfactants are the Silwet® surfactants which are available CK Witco, OSi Division, Danbury, Conn. Representative Silwet surfactants are as follows.

| Name | Average MW | Average a + b | Average total c |
|---|---|---|---|
| L-7608 | 600 | 1 | 9 |
| L-7607 | 1,000 | 2 | 17 |
| L-77 | 600 | 1 | 9 |
| L-7605 | 6,000 | 20 | 99 |
| L-7604 | 4,000 | 21 | 53 |
| L-7600 | 4,000 | 11 | 68 |
| L-7657 | 5,000 | 20 | 76 |
| L-7602 | 3,000 | 20 | 29 |

The molecular weight of the polyalkyleneoxy group ($R^1$) is less than or equal to about 10,000. Preferably, the molecular weight of the polyalkyleneoxy group is less than or equal to about 8,000, and most preferably ranges from about 300 to about 5,000. Thus, the values of c and d can be those numbers which provide molecular weights within these ranges. However, the number of ethyleneoxy units (—$C_2H_4O$) in the polyether chain ($R^1$) must be sufficient to render the polyalkyleneoxide polysiloxane water dispersible or water soluble. If propyleneoxy groups are present in the polyalkylenoxy chain, they can be distributed randomly in the chain or exist as blocks. Preferred Silwet surfactants are L-7600, L-7602, L-7604, L-7605, L-7657, and mixtures thereof. Besides surface activity, polyalkyleneoxide polysiloxane surfactants can also provide other benefits, such as antistatic benefits, and softness to fabrics.

The preparation of polyalkyleneoxide polysiloxanes is well known in the art. Polyalkyleneoxide polysiloxanes of the present invention can be prepared according to the procedure set forth in U.S. Pat. No. 3,299,112, incorporated herein by reference.

Another suitable silicone surfactants is SF-1488 which is available from GE silicone fluids.

These and other surfactants suitable for use in combination with the lipophilic fluid as adjuncts are well known in the art, being described in more detail in Kirk Othmer's Encyclopedia of Chemical Technology, 3rd Ed., Vol. 22, pp. 360-379, "Surfactants and Detersive Systems", incorporated by reference herein. Further suitable nonionic detergent surfactants are generally disclosed in U.S. Pat. No. 3,929,678, Laughlin et al., issued Dec. 30, 1975, at column 13, line 14 through column 16, line 6, incorporated herein by reference.

It has also surprisingly been discovered that certain materials which are surface active in supercritical or sub critical carbon dioxide dry-cleaning can be useful adjuncts in the present process. They have surface-active behavior, but need not necessarily be surfactants in the conventional sense of being surface active in water. Such materials can, for example, comprise one or more $CO_2$-philic moieties and one or more $CO_2$-phobic moieties, and are extensively described and disclosed in various published patents and patent applications from Air Products (see for example the acetylenic alcohols and diols in U.S. Pat. No. 5,789,505), from Air Liquide, Lever/Unilever (see for example U.S. Pat. No. 5,977,045, all surfactants referred to therein being specifically incorporated for use herein), MiCell Corp. and/or Joseph de Simone (see for example U.S. Pat. No. 5,858,022 and U.S. Pat. No. 5,944,996) and other sources. Remarkably, these materials have now been discovered to be useful in a wide range of fabric article and hard surface cleaning processes, whether immersive or non-immersive, that make use of lipohilic cleaning fluids as defined herein; moreover they can broadly be used with Fluorinert FC-43 and other fluorinated solvent materials, irrespective of whether these solvent materials dissolve sebum or not and irrespective of the spirit and scope of the present invention.

Suitable odor control agents include agents include, cyclodextrins, odor neutralizers, odor blockers and mixtures thereof. Suitable odor neutralizers include aldehydes, flavanoids, metallic salts, water-soluble polymers, zeolites, activated carbon and mixtures thereof.

Perfumes and perfumery ingredients useful in the present compositions and processes comprise a wide variety of natural and synthetic chemical ingredients, including, but not limited to, aldehydes, ketones, esters, and the like. Also included are various natural extracts and essences which can comprise complex mixtures of ingredients, such as orange oil, lemon oil, rose extract, lavender, musk, patchouli, balsamic essence, sandalwood oil, pine oil, cedar, and the like. Finished perfumes may comprise extremely complex mixtures of such ingredients. In the processes of the present invention, because significantly lower wash volumes are used, more concentrated perfumes in lesser amounts may be used. This is because most, if not all, of the perfume will be applied to the fabric articles and not either washed away never having contacting the fabric or destroyed by the other components of the detergent composition in the wash liquor. Pro-perfumes are also useful in the present invention. Such materials are those precursors or mixtures thereof capable of chemically reacting, e.g., by hydrolysis, to release a perfume, and are described in patents and/or published patent applications to Procter and Gamble, Firmenich, Givaudan and others.

Beaches, especially oxygen bleach types, are another type of additive suitable for use as an adjunct ingredient. This is especially the case for the activated and catalyzed forms with such bleach activators as nonanoyloxybenzenesulfonate and/or any of its linear or branched higher or lower homologs, and/or tetraacetylethylenediamine and/or any of its derivatives or derivatives of phthaloylimidoperoxycaproic acid (PAP) or other imido- or amido-substituted bleach activators including the lactam types, or more generally any mixture of hydrophilic and/or hydrophobic bleach activators (especially acyl derivatives including those of the $C_6$-$C_{16}$ substituted oxybenzenesulfonates).

Also suitable are organic or inorganic peracids both including PAP and other than PAP. Suitable organic or inorganic peracids for use herein include, but are not limited to: percarboxylic acids and salts; percarbonic acids and salts; perimidic acids and salts; peroxymonosulfuric acids and salts; persulphates such as monopersulfate; peroxyacids such as diperoxydodecandioic acid (DPDA); magnesium peroxyphthalic acid; perlauric acid; perbenzoic and alkylperbenzoic acids; and mixtures thereof.

One class of suitable organic peroxycarboxylic acids have the general formula:

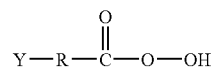

wherein R is an alkylene or substituted alkylene group containing from 1 to about 22 carbon atoms or a phenylene or substituted phenylene group, and Y is hydrogen, halogen, alkyl, aryl, —C(O)OH or —C(O)OOH.

Particularly preferred peracid compounds are those having the formula:

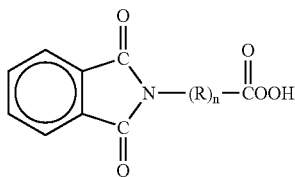

wherein R is $C_{1-4}$ alkyl and n is an integer of from 1 to 5. A particularly preferred peracid has the formula where R is $CH_2$ and n is 5 i.e., phthaloylamino peroxy caproic acid (PAP) as described in U.S. Pat. Nos. 5,487,818, 5,310,934, 5,246,620, 5,279,757 and 5,132,431. PAP is available from Ausimont SpA under the tradename Euroco.

Other cleaning product adjunct materials suitable herein include, but are not limited to, builders including the insoluble types such as zeolites including zeolites A, P and the so-called maximum aluminum P as well as the soluble types such as the phosphates and polyphosphates, any of the hydrous, water-soluble or water-insoluble silicates, 2,2'-oxydisuccinates, tartrate succinates, glycolates, NTA and many other ethercarboxylates or citrates; chelants including EDTA, S,S'-EDDS, DTPA and phosphonates; water-soluble polymers, copolymers and terpolymers; soil release polymers; optical brighteners; processing aids such as crisping agents and/fillers; anti-redeposition agents; hydrotropes, such as sodium, or calcium cumene sulfonate, potassium napthalenesulfonate, or the like, humectant; other perfumes or properfumes; dyes; photobleaches; thickeners; simple salts; alkalis such as those based on sodium or potassium including the hydroxides, carbonates, bicarbonates and sulfates and the like; and combinations of one or more of these adjunct ingredients.

Suitable finishing aids includes, but are not limited to, finishing polymers; such as synthetic, such as poly acrylates, or natural, such as, starch carboxymethyl cellulose, or hydroxypropyl methyl cellulose, odor control agent, odor neutralizers, perfume, properfume, anti-static agents, fabric softeners, insect and/or moth repelling agents and mixtures thereof.

The finishing polymers can be natural, or synthetic, and can act by forming a film, and/or by providing adhesive properties. E.g., the present invention can optionally use filmforming and/or adhesive polymer to impart shape retention to fabric, particularly clothing. By "adhesive" it is meant that when applied as a solution or a dispersion to a fiber surface and dried, the polymer can attach to the surface. The polymer can form a film on the surface, or when residing between two fibers and in contact with the two fibers, it can bond the two fibers together.

Nonlimiting examples of the finishing polymer that are commercially available are: polyvinylpyrrolidone/dimethylaminoethyl methacrylate copolymer, such as Copolymer 958®, molecular weight of about 100,000 and Copolymer 937, molecular weight of about 1,000,000, available from GAF Chemicals Corporation; adipic acid/dimethylaminohydroxypropyl diethylenetriamine copolymer, such as Cartaretin F-4® and F-23, available from Sandoz Chemicals Corporation; methacryloyl ethyl betaine/methacrylates copolymer, such as Diaformer Z-SM®, available from Mitsubishi Chemicals Corporation; polyvinyl alcohol copolymer resin, such as Vinex 2019®, available from Air Products and Chemicals or Moweol®, available from Clariant; adipic acid/epoxypropyl diethylenetriamine copolymer, such as Delsette 101®, available from Hercules Incorporated; polyamine resins, such as Cypro 515®, available from Cytec Industries; polyquaternary amine resins, such as Kymene 557H®, available from Hercules Incorporated; and polyvinylpyrrolidone/acrylic acid, such as Sokalan EG 310®, available from BASF.

Fabric softening agents are also suitable adjunct ingredients. Fabric softening agents may be present in the cleaning fluid as an optional adjunct ingredient. Fabric softening agents may also be included as part of any textile treatment liquid, that is for example, as part of a finishing fluid applied during the final stages of the treatment process.

One type of suitable fabric softening agents which may be used in the apparatus and methods of the present invention are quaternary ammonium compounds or amine precursors herein having the formula (I) or (II), below:

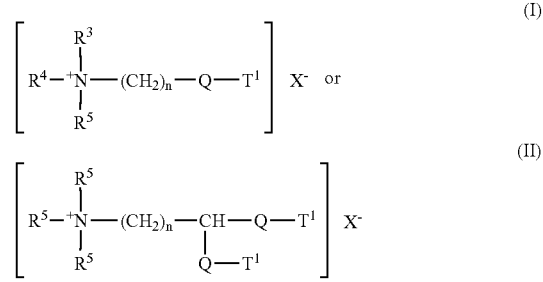

Q is —O—C(O)— or —C(O)—O— or —O—C(O)—O— or —$NR^6$—C(O)— or —C(O)—$NR^6$—;

$R^3$ is $(CH_2)_n$-Q-$T^2$ or $T^3$ or $R^5$;

$R^4$ is $(CH_2)_m$-Q-$T^4$ or $T^5$ or $R^5$;

$R^5$ is $C_1$-$C_4$ alkyl or $C_1$-$C_4$ hydroxyalkyl or H;

$R^6$ is H or $C_1$-$C_4$ alkyl or $C_1$-$C_4$ hydroxyalkyl;

$T^1$, $T^2$, $T^3$, $T^4$, $T^5$ are (the same or different) $C_{11}$-$C_{22}$ alkyl or alkenyl;

n and m are integers from 1 to 4; and $X^-$ is a softener-compatible anion, such as chloride, methyl sulfate, etc.

The alkyl, or alkenyl, chain $T^1$, $T^2$, $T^3$, $T^4$, $T^5$ must contain at least 11 carbon atoms, preferably at least 16 carbon atoms. The chain may be straight or branched.

Q, n, $T^1$, and $T^2$ may be the same or different when more than one is present in the molecule.

Tallow is a convenient and inexpensive source of long chain alkyl and alkenyl material. The compounds wherein $T^1$, $T^2$, $T^3$, $T^4$, $T^5$ represents the mixture of long chain materials typical for tallow are particularly preferred.

Specific examples of quaternary ammonium compounds suitable for use in apparatus and methods of the present invention include:
1) N,N-di(tallowyl-oxy-ethyl)-N,N-dimethyl ammonium chloride;
2) N,N-di(tallowyl-oxy-ethyl)-N-methyl, N-(2-hydroxyethyl) ammonium chloride;
3) N,N-di(2-tallowyloxy-2-oxo-ethyl)-N,N-dimethyl ammonium chloride;
4) N,N-di(2-tallowyloxyethylcarbonyloxyethyl)-N,N-dimethyl ammonium chloride;

5) N-(2-tallowoyloxy-2-ethyl)-N-(2-tallowyloxy-2-oxo-ethyl)-N,N-dimethyl ammonium chloride;
6) N,N,N-tri(tallowyl-oxy-ethyl)-N-methyl ammonium chloride;
7) N-(2-tallowyloxy-2-oxoethyl)-N-(tallowyl)-N,N-dimethyl ammonium chloride;
8) 1,2-ditallowyloxy-3-N,N,N-trimethylammoniopropane chloride; and
and mixtures of any of the above materials.

Of these, compounds 1-7 are examples of compounds of Formula (I); compound 8 is a compound of Formula (II).

Particularly preferred is N,N-di(tallowoyl-oxy-ethyl)-N,N-dimethyl ammonium chloride, where the tallow chains are at least partially unsaturated.

The level of unsaturation of the tallow chain can be measured by the Iodine Value (IV) of the corresponding fatty acid, which in the present case should preferably be in the range of from 5 to 100 with two categories of compounds being distinguished, having a IV below or above 25.

Indeed, for compounds of Formula (I) made from tallow fatty acids having a IV of from 5 to 25, preferably 15 to 20, it has been found that a cis/trans isomer weight ratio greater than about 30/70, preferably greater than about 50/50 and more preferably greater than about 70/30 provides optimal concentrability.

For compounds of Formula (I) made from tallow fatty acids having a IV of above 25, the ratio of cis to trans isomers has been found to be less critical unless very high concentrations are needed.

Other examples of suitable quaternary ammoniums of Formula (I) and (II) are obtained by, e.g., replacing "tallow" in the above compounds with, for example, coco, palm, lauryl, oleyl, ricinoleyl, stearyl, palmityl, or the like, said fatty acyl chains being either fully saturated, or preferably at least partly unsaturated;

replacing "methyl" in the above compounds with ethyl, ethoxy, propyl, propoxy, isopropyl, butyl, isobutyl or t-butyl;

replacing "chloride" in the above compounds with bromide, methylsulfate, formate, sulfate, nitrate, and the like.

In fact, the anion is merely present as a counterion of the positively charged quaternary ammonium compounds. The nature of the counterion is not critical at all to the practice of the present invention. The scope of this adjunct is not considered limited to any particular anion.

By "amine precursors thereof" is meant the secondary or tertiary amines corresponding to the above quaternary ammonium compounds, said amines being substantially protonated in the present compositions due to the claimed pH values.

The quaternary ammonium or amine precursors compounds herein when used as adjuncts in the cleaning fluid may be present at levels of from about 100 ppm to about 80%, more preferably 2000 ppm to about 50%, even more preferably from about 3000 ppm to about 20% of compositions herein, depending on the composition execution.

More detailed disclosure and exemplification of these optional quaternary ammonium or amine precursor fabric softeners can be found in U.S. patent application Ser. No. 09/242,623 to Robert et. al., filed Aug. 19, 1996, the relevant parts of which are incorporated herein by reference.

Softening agents also useful in the apparatus and methods of the present invention are nonionic fabric softener materials, which may optionally be in combination with cationic softening agents. Typically, such nonionic fabric softener materials have a HLB of from about 2 to about 9, more typically from about 3 to about 7. In general, the materials selected should be relatively crystalline, and higher melting, (e.g. >25° C.).

The level of optional nonionic softener in the apparatus and methods of the present invention herein is typically, when theses are present as adjuncts, from about 100 ppm to about 10%, preferably from about 1000 ppm to about 5%.

Some suitable nonionic softeners are fatty acid partial esters of polyhydric alcohols, or anhydrides thereof, wherein the alcohol, or anhydride, contains from 2 to 18, preferably from 2 to 8, carbon atoms, and each fatty acid moiety contains from 12 to 30, preferably from 16 to 20, carbon atoms. Typically, such softeners contain from one to 3, preferably 2 fatty acid groups per molecule.

The polyhydric alcohol portion of the ester can be ethylene glycol, glycerol, poly (e.g., di-, tri-, tetra, penta-, and/or hexa-) glycerol, xylitol, sucrose, erythritol, pentaerythritol, sorbitol or sorbitan. Sorbitan esters and polyglycerol monostearate are particularly preferred.

The fatty acid portion of the ester is normally derived from fatty acids having from 12 to 30, preferably from 16 to 20, carbon atoms, typical examples of said fatty acids being lauric acid, myristic acid, palmitic acid, stearic acid, oleic and behenic acid.

Highly preferred optional nonionic softening agents which are suitable for use in the apparatus and methods of the present invention are $C_{10}$-$C_{26}$ acyl sorbitan esters and polyglycerol monostearate. Sorbitan esters are esterified dehydration products of sorbitol. The preferred sorbitan ester comprises a member selected from the group consisting of $C_{10}$-$C_{26}$ acyl sorbitan monoesters and $C_{10}$-$C_{26}$ acyl sorbitan diesters and ethoxylates of said esters wherein one or more of the unesterified hydroxyl groups in said esters contain from 1 to about 6 oxyethylene units, and mixtures thereof. For the purpose of the present invention, sorbitan esters containing unsaturation (e.g., sorbitan monooleate) can be utilized.

Commercial sorbitan monostearate is a suitable material. Mixtures of sorbitan stearate and sorbitan palmitate having stearate/palmitate weight ratios varying between about 10:1 and about 1:10, and 1,5-sorbitan esters are also useful. See U.S. Pat. No. 2,322,821, Brown, issued Jun. 29, 1943, incorporated herein by reference.

The foregoing types of complex mixtures of anhydrides of sorbitol are collectively referred to herein as "sorbitan." It will be recognized that this "sorbitan" mixture will also contain some free, uncyclized sorbitol.

The preferred sorbitan softening agents of the type employed herein can be prepared by esterifying the "sorbitan" mixture with a fatty acyl group in standard fashion, e.g., by reaction with a fatty acid halide, fatty acid ester, and/or fatty acid. The esterification reaction can occur at any of the available hydroxyl groups, and various mono-, di-, etc., esters can be prepared. In fact, mixtures of mono-, di-, tri-, etc., esters almost always result from such reactions, and the stoichiometric ratios of the reactants can be simply adjusted to favor the desired reaction product.

For commercial production of the sorbitan ester materials, etherification and esterification are generally accomplished in the same processing step by reacting sorbitol directly with fatty acids. Such a method of sorbitan ester preparation is described more fully in MacDonald; "Emulsifiers:" Processing and Quality Control: Journal of the American Oil Chemists' Society, Vol. 45, October 1968.

Details, including formula, of the preferred sorbitan esters can be found in U.S. Pat. No. 4,128,484, incorporated hereinbefore by reference.

Certain derivatives of the preferred sorbitan esters herein, especially the "lower" ethoxylates thereof (i.e., mono-, di-, and tri-esters wherein one or more of the unesterified —OH groups contain one to about twenty oxyethylene moieties (Tweens®) are also useful in the composition of the present invention. Therefore, for purposes of the present invention, the term "sorbitan ester" includes such derivatives.

For the purposes of the present invention, it is preferred that a significant amount of di- and tri-sorbitan esters are present in the ester mixture. Ester mixtures having from 20-50% mono-ester, 25-50% di-ester and 10-35% of tri- and tetra-esters are preferred.

The material which is sold commercially as sorbitan mono-ester (e.g., monostearate) does in fact contain significant amounts of di- and tri-esters and a typical analysis of sorbitan monostearate indicates that it comprises about 27% mono-, 32% di- and 30% tri- and tetra-esters. Commercial sorbitan monostearate therefore is a preferred material. Mixtures of sorbitan stearate and sorbitan palmitate having stearate/palmitate weight ratios varying between 10:1 and 1:10, and 1,5-sorbitan esters are useful. Both the 1,4- and 1,5-sorbitan esters are useful herein.

Other useful alkyl sorbitan esters suitable for use in the apparatus and methods of the present invention include sorbitan monolaurate, sorbitan monomyristate, sorbitan monopalmitate, sorbitan monobehenate, sorbitan monooleate, sorbitan dilaurate, sorbitan dimyristate, sorbitan dipalmitate, sorbitan distearate, sorbitan dibehenate, sorbitan dioleate, and mixtures thereof, and mixed tallowalkyl sorbitan mono- and di-esters. Such mixtures are readily prepared by reacting the foregoing hydroxy-substituted sorbitans, particularly the 1,4- and 1,5-sorbitans, with the corresponding acid, ester, or acid chloride in a simple esterification reaction. It is to be recognized, of course, that commercial materials prepared in this manner will comprise mixtures usually containing minor proportions of uncyclized sorbitol, fatty acids, polymers, isosorbide structures, and the like. In the present invention, it is preferred that such impurities are present at as low a level as possible.

The preferred sorbitan esters employed herein can contain up to about 15% by weight of esters of the C20-C26, and higher, fatty acids, as well as minor amounts of C8, and lower, fatty esters.

Glycerol and polyglycerol esters, especially glycerol, diglyceryl, triglycerol, and polyglycerol mono- and/or di-esters, preferably mono-, are preferred herein (e.g. polyglycerol monostearate with a trade name of Radiasurf® 7248).

Useful glycerol and polyglycerol esters include mono-esters with stearic, oleic, palmitic, lauric, isostearic, myristic, and/or behenic acids and the diesters of stearic, oleic, palmitic, lauric, isostearic, behenic, and/or myristic acids. It is understood that the typical mono-ester contains some di- and tri-ester, etc.

The "glycerol esters" also include the polyglycerol, e.g., diglycerol through octaglycerol esters. The polyglycerol polyols are formed by condensing glycerin or epichlorohydrin together to link the glycerol moieties via ether linkages. The mono- and/or diesters of the polyglycerol polyols are preferred, the fatty acyl groups typically being those described hereinbefore for the sorbitan and glycerol esters. More detailed disclosure and of exemplification of these optional nonionic fabric softeners can be found in U.S. patent application Ser. No. 09/242,623 to Robert et. al., filed Aug. 19, 1996, and Ser. No. 09/319,751 to Michael et. al., filed Dec. 19, 1996, both incorporated herein by reference.

Additional fabric softening agents useful herein are described in U.S. Pat. No. 4,661,269, issued Apr. 28, 1987, in the names of Toan Trinh, Errol H. Wahl, Donald M. Swartley, and Ronald L. Hemingway; U.S. Pat. No. 4,439,335, Burns, issued Mar. 27, 1984; and in U.S. Pat. No. 3,861,870, Edwards and Diehl; U.S. Pat. No. 4,308,151, Cambre; U.S. Pat. No. 3,886,075, Bernardino; U.S. Pat. No. 4,233,164, Davis; U.S. Pat. No. 4,401,578, Verbruggen; U.S. Pat. No. 3,974,076, Wiersema and Rieke; U.S. Pat. No. 4,237,016, Rudkin, Clint, and Young; and European Patent Application publication No. 472,178, by Yamamura et al., all of said documents being incorporated herein by reference.

For example, suitable fabric softener agents useful herein may comprise one, two, or all three of the following fabric softening agents:

(a) the reaction product of higher fatty acids with a polyamine selected from the group consisting of hydroxyalkylalkylenediamines and dialkylenetriamines and mixtures thereof (preferably from about 10% to about 80%); and/or (b) cationic nitrogenous salts containing only one long chain acyclic aliphatic $C_{15}$-$C_{22}$ hydrocarbon group (preferably from about 3% to about 40%); and/or (c) cationic nitrogenous salts having two or more long chain acyclic aliphatic $C_{15}$-$C_{22}$ hydrocarbon groups or one said group and an arylalkyl group (preferably from about 10% to about 80%);

with said (a), (b) and (c) preferred percentages being by weight of the fabric softening agent used in the apparatus and methods of the present invention compositions.

The preferred Component (a) is a nitrogenous compound selected from the group consisting of the reaction product mixtures or some selected components of the mixtures. More specifically, the preferred Component (a) is a compound selected from the group consisting of substituted imidazoline compounds having the formula:

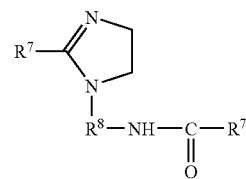

wherein $R^7$ is an acyclic aliphatic $C_{15}$-$C_{21}$ hydrocarbon group and $R^8$ is a divalent $C_1$-$C_3$ alkylene group.

Component (a) materials are commercially available as: Mazamide® 6, sold by Mazer Chemicals, or Ceranine® HC, sold by Sandoz Colors & Chemicals; stearic hydroxyethyl imidazoline sold under the trade names of Alkazine® ST by Alkaril Chemicals, Inc., or Schercozoline® S by Scher Chemicals, Inc.; N,N"-ditallowalkoyldiethylenetriamine; 1-tallowamidoethyl-2-tallowimidazoline (wherein in the preceding structure $R^1$ is an aliphatic $C_{15}$-$C_{17}$ hydrocarbon group and $R^8$ is a divalent ethylene group).

Both N,N"-ditallowalkoyldiethylenetriamine and 1-tallow (amidoethyl)-2-tallowimidazoline are reaction products of tallow fatty acids and diethylenetriamine, and are precursors of the cationic fabric softening agent methyl-1-tallowamidoethyl-2-tallowimidazolinium methylsulfate (see "Cationic Surface Active Agents as Fabric Softeners," R. R. Egan, Journal of the American Oil Chemicals' Society, January 1978, pages 118-121). N,N"-ditallow alkoyldiethylenetriamine and 1-tallowamidoethyl-2-tallowimidazoline can be obtained from Witco Chemical Company as experimental chemicals.

Methyl-1-tallowamidoethyl-2-tallowimidazolinium methylsulfate is sold by Witco Chemical Company under the tradename Varisoft® 475.

Component (b): The preferred Component (b) is a cationic nitrogenous salt containing one long chain acyclic aliphatic $C_{15}$-$C_{22}$ hydrocarbon group, preferably selected from acyclic quaternary ammonium salts having the formula:

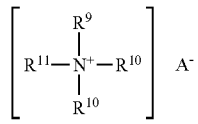

wherein $R^9$ is an acyclic aliphatic $C_{15}$-$C_{22}$ hydrocarbon group, $R^{10}$ and $R^{11}$ are $C_1$-$C_4$ saturated alkyl or hydroxy alkyl groups, and A− is an anion.

Examples of Component (b) are the monoalkyltrimethylammonium salts such as monotallowtrimethylammonium chloride, mono(hydrogenated tallow)trimethylammonium chloride, palmityltrimethyl ammonium chloride and soyatrimethylammonium chloride, sold by Witco Chemical Company under the trade name Adogen® 471, Adogen® 441, Adogen® 444, and Adogen® 415, respectively. In these salts, $R^9$ is an acyclic aliphatic $C_{16}$-$C_{18}$ hydrocarbon group, and $R^{10}$ and $R^{11}$ are methyl groups. Mono(hydrogenated tallow)trimethylammonium chloride and monotallowtrimethylammonium chloride are preferred.

Other examples of Component (b) are behenyltrimethylammonium chloride wherein $R^9$ is a $C_{22}$ hydrocarbon group and sold under the trade name Kemamine® Q2803-C by Humko Chemical Division of Witco Chemical Corporation; soyadimethylethylammonium ethylsulfate wherein $R^9$ is a $C_{16}$-$C_{18}$ hydrocarbon group, $R^{10}$ is a methyl group, $R^{11}$ is an ethyl group, and A− is an ethylsulfate anion, sold under the trade name Jordaquat® 1033 by Jordan Chemical Company; and methyl-bis(2-hydroxyethyl)-octadecylammonium chloride wherein $R^9$ is a $C_{18}$ hydrocarbon group, $R^{10}$ is a 2-hydroxyethyl group and $R^{11}$ is a methyl group and available under the trade name Ethoquad® 18/12 from Armak Company.

Other examples of Component (b) are 1-ethyl-1-(2-hydroxy ethyl)-2-isoheptadecylimidazolinium ethylsulfate, available from Mona Industries, Inc. under the trade name Monaquat® ISIES; mono(tallowoyloxyethyl) hydroxyethyldimethylammonium chloride, i.e., monoester of tallow fatty acid with di(hydroxyethyl)dimethylammonium chloride, a by-product in the process of making diester of tallow fatty acid with di(hydroxyethyl)dimethylammonium chloride, i.e., di(tallowoyloxyethyl) dimethylammonium chloride.

Component (c): Preferred cationic nitrogenous salts having two or more long chain acyclic aliphatic $C_{15}$-$C_{22}$ hydrocarbon groups or one said group and an arylalkyl group which can be used either alone or as part of a mixture are selected from the group consisting of:

(i) acyclic quaternary ammonium salts having the formula:

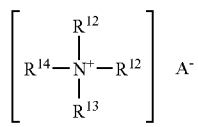

wherein $R^{12}$ is an acyclic aliphatic $C_{15}$-$C_{22}$ hydrocarbon group, $R^{13}$ is a $C_1$-$C_4$ saturated alkyl or hydroxyalkyl group, $R^{14}$ is selected from the group consisting of $R^{12}$ and $R^{13}$ groups, and A− is an anion defined as above;

(ii) diamido quaternary ammonium salts having the formula:

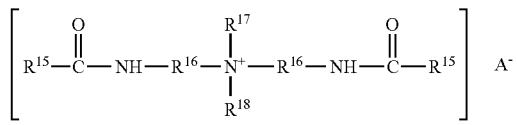

wherein $R^{15}$ is an acyclic aliphatic $C_{15}$-$C_{21}$ hydrocarbon group, each $R^{16}$ is the same or different divalent alkylene group having 1 to 3 carbon atoms, $R^{17}$ and $R^{18}$ are $C_1$-$C_4$ saturated alkyl or hydroxyalkyl groups, and A− is an anion;

(iii) diamino alkoxylated quaternary ammonium salts having the formula:

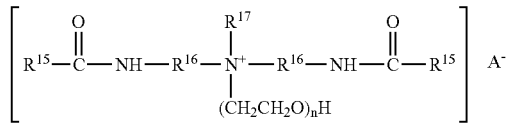

wherein n is equal to 1 to about 5, and $R^{15}$, $R^{16}$, $R^{17}$ and A− are as defined above;

(iv)

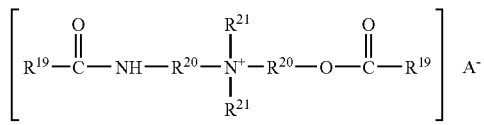

wherein $R^{19}$ is an acyclic aliphatic $C_{15}$-$C_{21}$ hydrocarbon group, $R^{20}$ is the same or different divalent alkylene group having 1 to 3 carbon atoms, each $R^{21}$ are independently selected from $C_1$-$C_4$ saturated alkyl or hydroxyalkyl groups, A− is an anion and $R^{20}$ is the same or different from the other $R^{20}$.

(v) mixtures thereof.

Examples of Component (c) are the well-known dialkyldimethylammonium salts such as ditallowdimethylammonium chloride, ditallowdimethylammonium methylsulfate, di(hydrogenatedtallow)dimethylammonium chloride, distearyldimethylammonium chloride, dibehenyldimethylammonium chloride. Di(hydrogenatedtallow)di methylammonium chloride and ditallowdimethylammonium chloride are preferred. Examples of commercially available dialkyldimethyl ammonium salts usable in the present invention are di(hydrogenatedtallow)dimethylammonium chloride (trade name Adogen® 442), ditallowdimethylammonium chloride (trade name Adogen® 470), distearyl dimethylammonium chloride (trade name Arosurf® TA-100), all available from Witco Chemical Company. Dibehenyldimethylammonium chloride is sold under the trade name Kemamine Q-2802C by Humko Chemical Division of Witco Chemical Corporation.

Other examples of Component (c) are methylbis(tallowamidoethyl)(2-hydroxyethyl)ammonium methylsulfate and methylbis(hydrogenated tallowamidoethyl)(2-hydroxyethyl) ammonium methylsulfate; these materials are available from Witco Chemical Company under the trade names Varisoft® 222 and Varisoft® 110, respectively: dimethylstearylbenzyl ammonium chloride sold under the trade names Varisoft® SDC by Witco Chemical Company and Ammonyx® 490 by Onyx Chemical Company.

In the cationic nitrogenous salts described hereinbefore, the anion A– provides charge neutrality. Most often, the anion used to provide charge neutrality in these salts is a halide, such as chloride or bromide. However, other anions can be used, such as methylsulfate, ethylsulfate, hydroxide, acetate, formate, citrate, sulfate, carbonate, and the like. Chloride and methylsulfate are preferred herein as anion A–.

Some preferred fabric softening compounds used in the apparatus and methods of the present invention are biodegradable quaternary ammonium compounds according to I and II as hereinbefore described, wherein, preferably, the fatty acyl groups have an Iodine Value (IV) of from greater than about 5 to less than about 100, and, also preferably, a cis/trans isomer weight ratio of greater than about 30/70 when the IV is less than about 25, the level of unsaturation preferably being less than about 65% by weight.

When the IV of the fatty acyl groups is above about 20, the softener provides excellent antistatic effect. Antistatic effects are especially important where the fabrics are dried in a tumble dryer, in the apparatus of the present invention, by the methods of the present invention and/or where synthetic materials which generate static are used. Maximum static control occurs with an IV of greater than about 20, preferably greater than about 40. When fully saturated softener compounds are used poor static control results. Also concentratability increases as IV increases. The benefits of concentratability include: use of less packaging material; use of less organic solvents, especially volatile organic solvents; use of less concentration aids which typically add nothing to performance; etc. In any event it is preferred in one embodiment of the present invention that any finishing fluid include a softener which provides an excellent antistatic effect.

The above softener actives derived from highly unsaturated fatty acyl groups, i.e., fatty acyl groups having a total unsaturation above about 65% by weight, do not provide any additional improvement in antistatic effectiveness. They may, however, be able to provide other benefits such as improved water absorbency of the fabrics. In general, an IV range of from about 40 to about 65 is preferred for concentratability, maximization of fatty acyl sources, excellent softness, static control, etc.

It will be understood that substituents R and $R^1$ can optionally be substituted with various groups such as alkoxyl or hydroxyl groups. The preferred compounds can be considered to be diester variations of ditallow dimethyl ammonium chloride (DTDMAC), which is a widely used fabric softener. At least 80% of the softener compound, i.e., DEQA is preferably in the diester form, and from 0% to about 20%, preferably less than about 10%, more preferably less than about 5%, can be monoester, i.e., DEQA monoester (e.g., containing only one —Y—$R^1$ group).

A specific example of a biodegradable (DEQA) compound suitable for use in the apparatus and methods of the present invention is: 1,2-bis(tallowyl oxy)-3-trimethyl ammoniopropane methylsulfate (DTTMAPMS).

As used herein, when the diester is specified, it will include the monoester that is normally present. For the optimal antistatic benefit the percentage of monoester should be as low as possible, preferably less than about 2.5%. The level of monoester present can be controlled in the manufacturing of the EQA.

These additional fabric softening agents and general methods of making them are disclosed in U.S. Pat. No. 4,137,180, Naik et al., issued Jan. 30, 1979, and U.S. patent application Ser. No. 09/242,623 to Robert et. al., filed Aug. 19, 1996, and Ser. No. 09/319,751 to Michael et. al., filed Dec. 19, 1996, which are all incorporated herein by reference.

The adjunct may also be an antistatic agent. Any suitable well known antistatic agents used in laundering and dry cleaning art are suitable for use in the apparatus, methods and compositions of the present invention. Especially suitable as antistatic agents are the subset of fabric softeners which are known to provide antistatic benefits. For example those fabric softeners which have a fatty acyl group which has an iodine value of above 20, such as N,N-di(tallowoyl-oxy-ethyl)-N,N-dimethyl ammonium methylsulfate. However, it is to be understood that the term antistatic agent is not to be limited to just this subset of fabric softeners and includes all antistatic agents.

Preferred insect and moth repellent agents useful in the present invention are perfume ingredients, such as citronellol, citronellal, citral, linalool, cedar extract, geranium oil, sandalwood oil, 2-(diethylphenoxy)ethanol, 1-dodecene, etc. Other examples of insect and/or moth repellents useful in the composition of the present invention are disclosed in U.S. Pat. Nos. 4,449,987; 4,693,890; 4,696,676; 4,933,371; 5,030,660; 5,196,200; and in "Semio Activity of Flavor and Fragrance Molecules on Various Insect Species", B. D. Mookherjee et al., published in *Bioactive Volatile Compounds from Plants*, ASC Symposium Series 525, R. Teranishi, R. G. Buttery, and H. Sugisawa, 1993, pp. 35-48, all of said patents and publications being incorporated herein by reference.

Treated Fabric Article

A fabric article which has been treated in accordance with the present invention is also within the scope of the present invention. Preferably such a treated fabric article comprises an analytically detectable amount of at least one compound (e.g., an organosilicone) having a surface energy modifying effect but no antistatic effect; or an analytically detectable amount of at least one compound having a surface energy modifying and/or feel-modifying and/or comfort-modifying and/or aesthetic effect and at least one antistatic agent other than said at least one compound.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A composition comprising:
   i) a lipophilic fluid mixture comprising an organosilicone and a diol, wherein the lipophilic fluid comprises from about 50% to about 90% by weight of the composition;
   ii) a polyalkyleneoxide polysiloxane surfactant having the formula: $R^1$—$(CH_3)_2SiO$—$[(CH_3)_2SiO]_a$—$(CH_3)(R^1)SiO]_b$—$Si(CH_3)_2$—$R^1$ wherein a+b are from about 1 to about 50, each $R^1$ is the same or different and is a methyl group or a copolymer comprising an ethyleneoxide and/or propyleneoxide group having the general formula: —$(CH_2)_nO(C_2H_4O)_c(C_3H_6O)_dR^2$
   with at least one $R^1$ being a copolymer comprising an ethylene oxide and/or propylene oxide group, wherein n is 3 or 4; c is from 1 to about 100; d is from 0 to about 14; (c+d) is from about 5 to about 150; and each $R^2$ is the same or different and is hydrogen, C1-C4 alkyl, or an acetyl group;
   iii) a non-silicone surfactant which is a nonionic surfactant selected from the group consisting of a polyethylene oxide condensate of nonyl phenol and myristyl alcohol, or a fatty alcohol ethoxylate having the formula: R—$(OCH_2CH_2)_a$, wherein a is 1 to 100 and R is $C_8$-$C_{20}$ alkyl;
   iv) optionally, an adjunct ingredient; and
   v) optionally, a finishing agent;
   wherein the composition is a fabric cleaning composition.

2. The composition according to claim 1 wherein $R^1$ of the polyalkyleneoxide polysiloxane surfactant has a molecular weight less than or equal to about 10,000.

3. The composition according to claim 1 wherein the organosilicone solvent is a cyclic siloxane selected from the group consisting of octamethylcyclotetrasiloxane, decamethylcyclopentasiloxane, dodecamethylcyclohexasiloxane, and mixtures thereof.

4. The composition according to claim 1 wherein the organosilicone solvent is decamethylcyclopentasiloxane.

5. The composition according to claim 1 wherein the diol comprises C6, C8 or higher diols.

6. The composition according to claim 1 wherein the non-silicone surfactant is from about 0.001% to about 10% by weight of the lipophilic fluid.

7. The composition according to claim 1 further comprising a cationic surfactant which is a dialkylmethylammonium salt having the formula: R'R"N$^+$(CH$_3$)$_2$X$^-$, wherein each R' and R' is independently selected from the group consisting of 12-30 Carbon atoms or derived from tallow, coconut oil or soy, and X is Cl or Br.

8. The composition according to claim 1 wherein the adjunct ingredient is selected from the group consisting of: water, builders, enzymes, bleach activators, bleach catalysts, bleach boosters, bleaches, alkalinity sources, antibacterial agent, colorants, perfume, lime soap dispersants, odor control agents, odor neutralizers, polymeric dye transfer inhibiting agents, crystal growth inhibitors, photobleaches, heavy metal ion sequestrants, anti-tarnishing agents, anti-microbial agents, anti-oxidants, anti-redeposition agents, soil release polymers, electrolytes, pH modifiers, thickeners, abrasives, divalent ions, metal ion salts, enzyme stabilizers, corrosion inhibitors, diamines, suds stabilizing polymers, process aids, fabric softening agents or actives, sizing agents, optical brighteners, hydrotropes, and mixtures thereof.

9. The composition according to claim 1 wherein the adjunct ingredient comprises from 0 to about 50% by weight of the composition.

10. The composition according to claim 1—wherein the finishing agent is selected from the group consisting of water, finishing polymers, odor control agents, odor neutralizers, perfumes, properfumes, anti-static agents, antimicrobial agents, soil release agents, fabric softening agents or actives, insect and/or moth repelling agents, light protecting agents, sizing agents, crisping agents, hand-modifying agents, and mixtures thereof.

11. A method for treating fabric articles comprising the steps of:
    i) applying the composition of claim 1 to the fabric articles; and
    ii) removing the applied composition from the fabric articles.

12. A fabric article treated by the method according to claim 11.

* * * * *

UNITED STATES PATENT AND TRADEMARK OFFICE
CERTIFICATE OF CORRECTION

PATENT NO.        : 7,704,937 B2
APPLICATION NO.   : 12/206306
DATED             : April 27, 2010
INVENTOR(S)       : Anna Vadimovna Noyes et al.

Page 1 of 1

It is certified that error appears in the above-identified patent and that said Letters Patent is hereby corrected as shown below:

Title Page, Item [56]
Page 2, U.S. Patent Documents, insert -- 6,309,425 B1  10/2001  Murphy --.

Column 2
Line 36, insert after "be", -- optionally combined with the lipophilic fluid and/or the textile treatment liquid. These optional adjunct ingredients are described in more detail hereinbelow. --.

Signed and Sealed this
Twenty-fourth Day of July, 2012

David J. Kappos
*Director of the United States Patent and Trademark Office*